United States Patent
Alteneiji

(10) Patent No.: US 9,608,477 B1
(45) Date of Patent: Mar. 28, 2017

(54) ENHANCING COLLECTION OF ELECTRICAL POWER IN AN ENERGY COLLECTION SYSTEM INCLUDING RADIALLY CONNECTED TRANSFORMATION UNITS

(71) Applicant: Hamad Musabeh Ahmed Saif Alteneiji, Sharjah (AE)

(72) Inventor: Hamad Musabeh Ahmed Saif Alteneiji, Sharjah (AE)

( * ) Notice: Subject to any disclaimer, the term of this patent is extended or adjusted under 35 U.S.C. 154(b) by 0 days.

(21) Appl. No.: 14/862,263

(22) Filed: Sep. 23, 2015

Related U.S. Application Data

(63) Continuation of application No. 14/846,007, filed on Sep. 4, 2015, now abandoned.

(51) Int. Cl.
*H02J 7/35* (2006.01)
*H02J 3/38* (2006.01)
*H02J 7/00* (2006.01)

(52) U.S. Cl.
CPC .............. *H02J 7/355* (2013.01); *H02J 3/383* (2013.01); *H02J 3/386* (2013.01); *H02J 7/007* (2013.01)

(58) Field of Classification Search
CPC .. H02J 3/382; H02J 3/383; H02J 7/355; H02J 7/007; H02J 3/386; Y02E 10/563; Y10T 307/344; Y10T 307/615; Y10T 307/696; Y10T 307/729
USPC ........................................ 307/23, 64, 80, 86
See application file for complete search history.

(56) References Cited

U.S. PATENT DOCUMENTS

| 5,896,281 | A  | * | 4/1999 | Bingley | .................. | H02J 3/382 |
| | | | | | | 307/77 |
| 2013/0193766 | A1 | * | 8/2013 | Irwin | ..................... | H02H 7/268 |
| | | | | | | 307/82 |
| 2014/0062196 | A1 | * | 3/2014 | Wijekoon | .............. | H02H 7/267 |
| | | | | | | 307/39 |
| 2014/0183960 | A1 | * | 7/2014 | Balachandreswaran | | H01L 31/042 |
| | | | | | | 307/82 |
| 2015/0145349 | A1 | * | 5/2015 | Bausch | ................ | H01H 9/0016 |
| | | | | | | 307/135 |

(Continued)

*Primary Examiner* — Yalkew Fantu
*Assistant Examiner* — Manuel Hernandez
(74) *Attorney, Agent, or Firm* — Buchanan, Ingersoll & Rooney PC

(57) ABSTRACT

There is provided an energy collection system comprising a first switching station electrically connected to a first set of one or more transformation units for receiving a first electrical power generated thereby; a second switching station electrically connected to a second set of one or more transformation units for receiving a second electrical power generated thereby; a sub-transmission station having a first primary electrical connection with the first switching station and a second primary electrical connection with the second switching station for receiving the first and second electrical powers; and a secondary electrical connection between the first and second switching stations; wherein the secondary electrical connection and the first and second primary electrical connections form, alone or using further connections, a closed-loop electrical circuit between the first switching station, the second switching station and the sub-transmission station. There is also provided a method of enhancing collection of electrical power in an energy collection system.

16 Claims, 28 Drawing Sheets

(56) References Cited

U.S. PATENT DOCUMENTS

2015/0152850 A1* 6/2015 Nielsen .................. F03D 80/82
                                                     290/44
2016/0049792 A1* 2/2016 Burra ................. G05B 19/0421
                                                     307/52

* cited by examiner 3D drawing of Transformation unit:
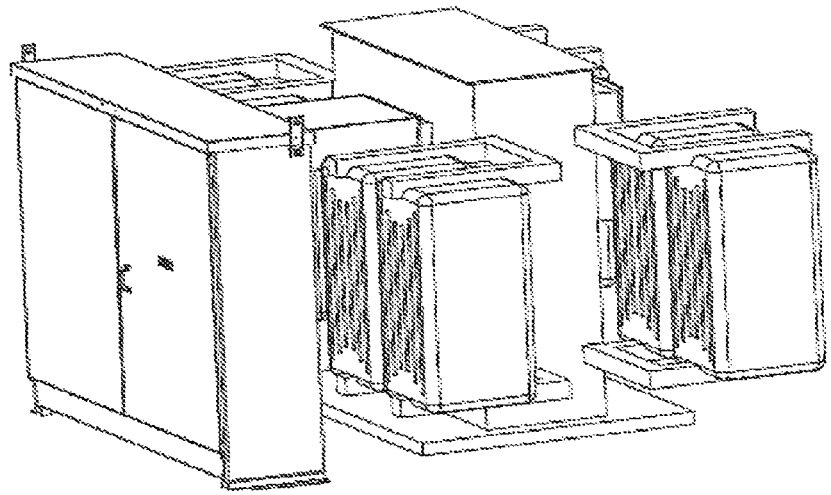
Conventional type Transformer is coupled solidly with LV panel.
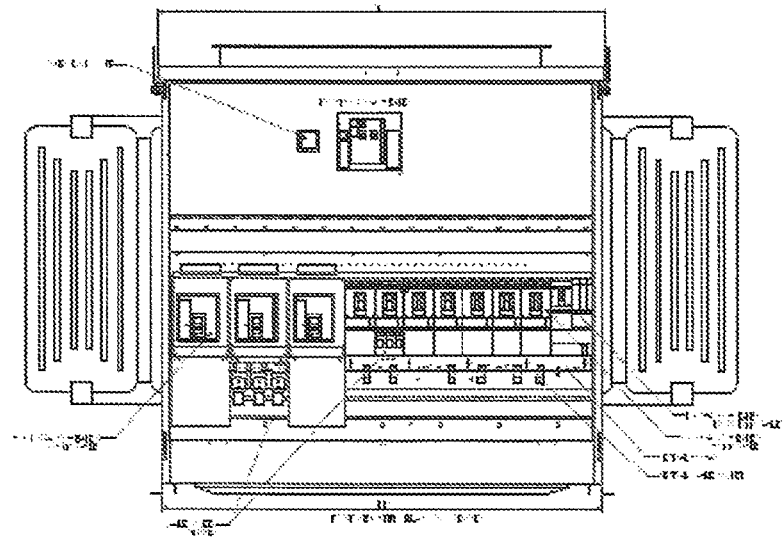
LV Panel drawing with its ACB and different sizes of MCCBs.
Figure 1

ENHANCING COLLECTION OF ELECTRICAL POWER IN AN ENERGY COLLECTION SYSTEM INCLUDING RADIALLY CONNECTED TRANSFORMATION UNITS

FIELD OF THE INVENTION

The present invention generally relates to the field of electrical energy collection. In particular, the present invention relates to an optimized electrical energy collection system for large scale renewable projects and to a method of enhancing collection of electrical power in an energy collection system.

BACKGROUND OF THE INVENTION

Renewable energy projects convert the physical potential energy present in the nature like winds, solar and bio-energy into a useful electrical energy. Energy collection system of large scale renewable energy project plays major role in collecting produced electrical energy generated in the form of DC & AC electrical power and delivers it to transmission substation to be transmitted to areas of demand via grid lines. It can be defined as the part of electric system of renewable power generation project between the renewable generation technology that produce energy and transmission substation.

The energy collection system represents significant cost percentage of the balance of system BOS of renewable project and causes some loss of energy which both affect the economics of the project. Furthermore, this cost percentage is not constant with the capacity of the project, but it increases up as the installed capacity MWp of the project goes up due to the need of multiple voltage level networks to handle such large amount of energy (LV, MV, HV and EHV). In contrast, the renewable energy technologies cost per unit declines with regards to increase in the required capacity. For example, solar panels and solar inverters per unit costs are decreasing when the installed capacity of solar project increases.

SUMMARY OF THE INVENTION

The present invention thus provides an optimized energy collection system for large scale renewable project adapted to reduce the electrical balance of system (EBoS) of large scale renewable energy projects and to increase the efficiency of the energy collection system. The energy collection system of the present invention has the ability for further simplifying the network, reducing the initial and maintenance costs, increasing the efficiency and improving of the reliability of the system.

As a first aspect of the present invention, there is provided an energy collection system comprising:
  a first switching station electrically connected to a first set of one or more transformation units for receiving a first electrical power generated thereby;
  a second switching station electrically connected to a second set of one or more transformation units for receiving a second electrical power generated thereby;
  a sub-transmission station having a first primary electrical connection with the first switching station and a second primary electrical connection with the second switching station for receiving the first and second electrical powers; and
  a secondary electrical connection between the first and second switching stations;
  wherein the secondary electrical connection and the first and second primary electrical connections form, alone or using further connections, a closed-loop electrical circuit between the first switching station, the second switching station and the sub-transmission station.

Preferably, the first switching station is connected to the first set of one or more transformation units through a first radial connection; and the second switching station is connected to the second set of one or more transformation units through a second radial connection.

More preferably, the first switching station comprises a first switching gear board having a first switching gear board first input enabling the first radial connection with the first set of one or more transformation units, a first switching gear board first output enabling the secondary connection with the second switching station, and a first switching gear board second output enabling the first primary connection with the first sub-transmission station; and the second switching station comprises a second switching gear board having a second switching gear board first input enabling the second radial connection with the second set of one or more transformation units, a second switching gear board first output enabling the secondary connection with the first switching station, and a second switching gear board second output enabling the second primary connection with the sub-transmission station.

In a preferred embodiment of the present invention, the radial connections and the primary connections and the secondary connection are medium voltage electrical cables.

Preferably, the transformation units comprise photovoltaic module blocks. More preferably, the transformation units comprise wind turbines.

In another preferred embodiment, the further connections comprise one or more switching stations.

The present invention also relates to an energy collection network comprising:
  a plurality of switching stations divided into a number of sets, each set comprising a number of pairs, each pair comprising:
    a first switching station electrically connected to one or more sets of first one or more transformation units;
    a second switching station electrically connected to one or more sets of second one or more transformation units;
    a first secondary electrical connection between the first and second switching stations;
  a plurality of sub-transmission stations, each sub-transmission station being associated to a set of switching stations and having in connection with each pair of said set of switching stations:
    a first primary electrical connection with the first switching station and a second primary electrical connection with the second switching station for receiving the first and second electrical powers, such that the first secondary electrical connection and the first and second primary electrical connections form, alone or using further connections, a closed-loop electrical circuit between the first switching station, the second switching station and the sub-transmission station.
  a main transmission station connected to the plurality of sub-transmission stations and having in connection with each sub-transmission station a main electrical connection.

In a preferred embodiment of the present invention, each set among the one or more sets of the first one or more transformation units is connected to the first switching station through radial connections, where each one of the one or more transformation units has respectively one radial connection; and each set among the one or more sets of the second one or more transformation units is connected to the second switching station through respective radial connections, where each one of the one or more transformation units has respectively one radial connection.

Preferably, in the energy collection network of the present invention, the first switching station comprises a first switching gear board having:
  a number of first switching gear board inputs enabling the radial connections with the one or more sets of first one or more transformation units such that each one of the first switching gear board inputs enables a radial connection with one set of the first one or more transformation units;
  a first switching gear board first output enabling the first secondary connection with the second switching station; and
  a first switching gear board second output enabling the first primary connection with the sub-transmission station; and
the second switching station comprises a second switching gear board having:
  a number of second switching gear board inputs enabling the radial connections with the one or more sets of second one or more transformation units such that each one of the second switching gear board inputs enables a radial connection with one set of the second one or more transformation units;
  a second switching gear board first output enabling the second secondary connection with the first switching station; and
  a second switching gear board second output enabling the second primary connection with the sub-transmission station.

Still preferably, in the energy collection network of the present invention, the switching stations are divided into 4 sets, each set being divided into 8 pairs of switching stations. Preferably, the switching stations are 64 switching stations divided into 4 sets of 16 switching stations each, each set of switching stations divided into 8 pairs of switching stations.

In another preferred embodiment of the energy collection network of the present invention, the radial connections are medium voltage electrical cables, the primary connections and the secondary connections are medium voltage electrical cables, and wherein the main connections are high voltage electrical cables.

In a preferred embodiment of the energy collection network of the present invention, the transformation units are photovoltaic module blocks. More preferably, the transformation units are wind turbines.

The present invention also relates to a method of enhancing collection of electrical power in an energy collection system comprising a number of switching stations divided into a number of sets, each set comprising a number of pairs, the method comprising:
  for each pair of switching stations in a set, the pair comprising a first switching station having a first switching gear board and a second switching station having a second switching gear board:
    connecting a first set of one or more transformation units radially using a first input in the first switching gear board;
    connecting a second set of one or more transformation units radially using a first input in the second switching gear board;
    connecting the first switching station to the second switching station using a first output in the first switching gear board and a first output in the second switching gear board;
    connecting the first switching station to a first sub-transmission station using a second output in the first switching gear board;
    connecting the second switching station to the first sub-transmission station using a second output in the second switching gear board.

Preferably, the method of the present invention further comprises connecting a third set of one or more transformation units radially using a second input in the first switching gear board; and connecting a fourth set of one or more transformation units radially using a second input in the second switching gear board.

More preferably, The method further comprises:
  connecting the first sub-transmission station to the main transmission station;
  connecting the main transmission station to an electrical grid; and
  for each set of switching stations, repeating the above steps by replacing the first sub-transmission station with another sub-transmission station.

Preferably, in the method of the present invention:
  the radial connections are conducted using medium voltage electrical cables;
  the connection between the first and second switching stations are conducted using a medium voltage electrical cable;
  the connection between the first switching station and the first sub-transmission station is conducted using a medium voltage electrical cable;
  the connection between the second switching station and the first sub-transmission station is conducted using a medium voltage electrical cable;
  the connection between the first sub-transmission station and the main transmission station is conducted using a high voltage electrical cable or overhead lines; and
  the connection between the main station and the electrical grid is conducted using a higher voltage electrical cable or overhead lines.

In a still preferred embodiment of the method of the present invention, the transformation units comprise photovoltaic module blocks. Preferably, the transformation units comprise wind turbines.

The energy collection system of the present invention is particularly advantageous over the known traditional systems as is able to limit and reduce power losses to be less than 50% compared with traditional design while exceeding the limitation of existing power blocks size. For example, the system of the present invention exceeds the limitation on solar block size and transformer substation to become two times larger more up to 6 MWp solar block while current substation reaches around 3 MWp.

The system of the present invention is designed to be standard from high voltage side, with several options at medium voltage side and very flexible on low voltage side to suit with any type of renewable technologies and any shape of renewable project site.

In terms of saving costs, the energy collection system of the present invention has shown to reduce the cost to lower than half of the best practice in the market. The system is also able to reduce running cost, such as, maintenance and operational costs through the reduction of the required system components, more incorporation of maintenance free components and with better system configuration.

BRIEF DESCRIPTION OF THE DRAWINGS

FIG. 1 illustrates a 3D drawing of transformation unit including transformer and LV panel with its ACB and different sizes of MCCBs.

DETAILED DESCRIPTION OF THE INVENTION

Figure 2:
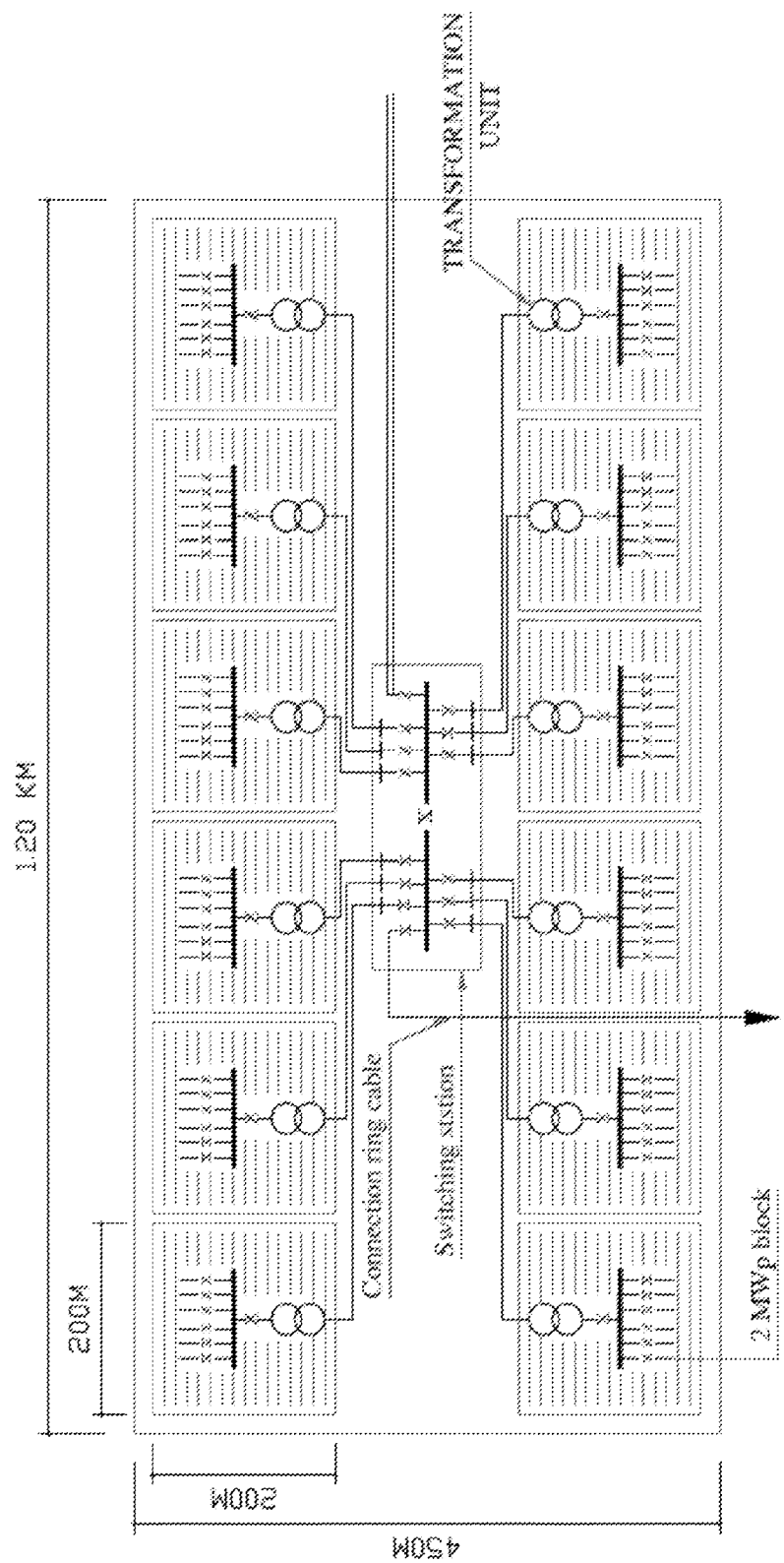
FIG. 2 illustrates an energy collection system of 2 MWp solar blocks comprising a switching station connecting 12 transformation units according to an embodiment of the invention.
Figure 3:
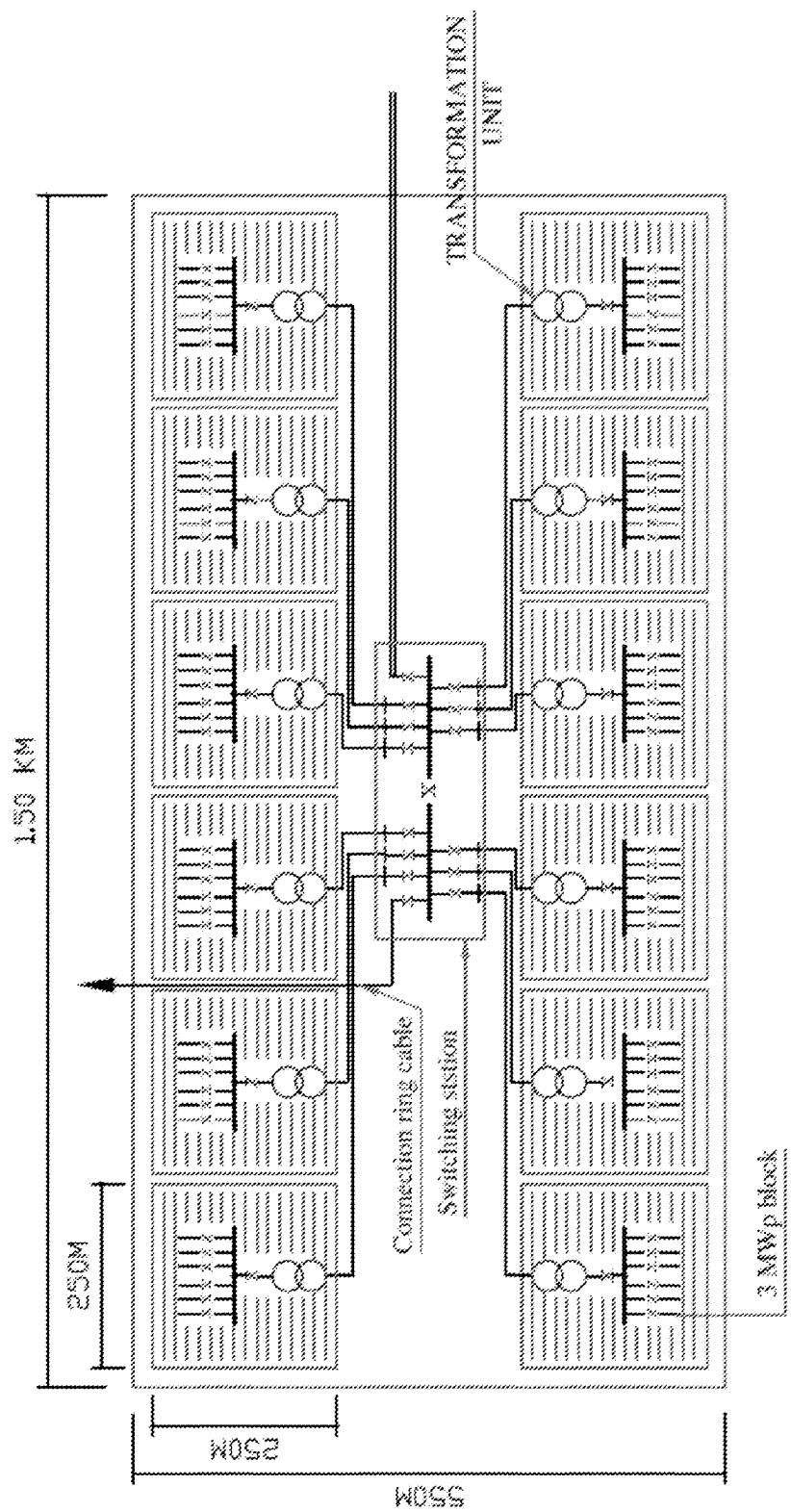
FIG. 3 illustrates an energy collection system of 3 MWp solar blocks comprising a switching station connecting 12 transformation units according to an embodiment of the invention.
Figure 4:
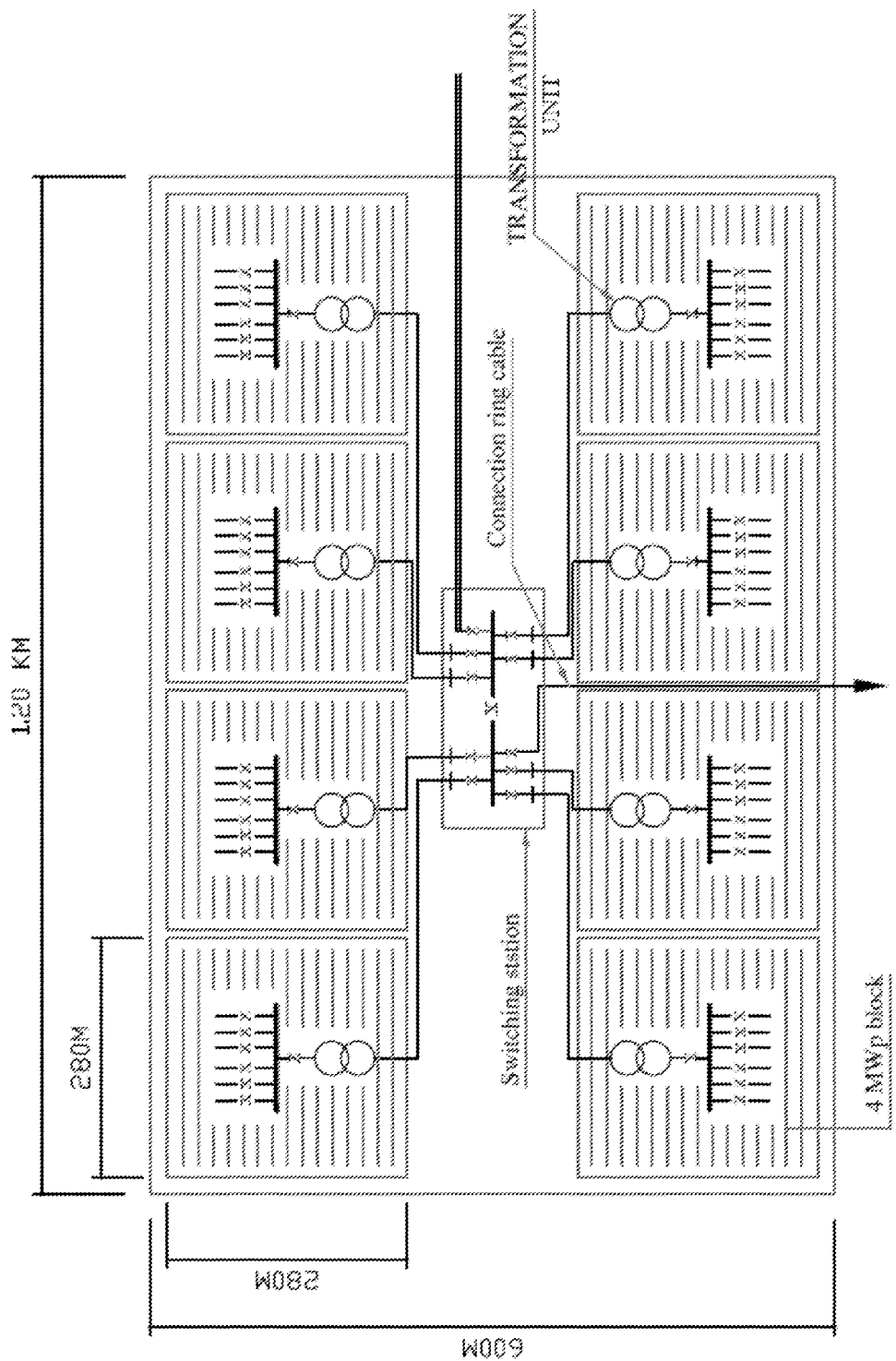
FIG. 4 illustrates an energy collection system of 4 MWp solar blocks comprising a switching station connecting 8 transformation units according to an embodiment of the invention.
Figure 5:
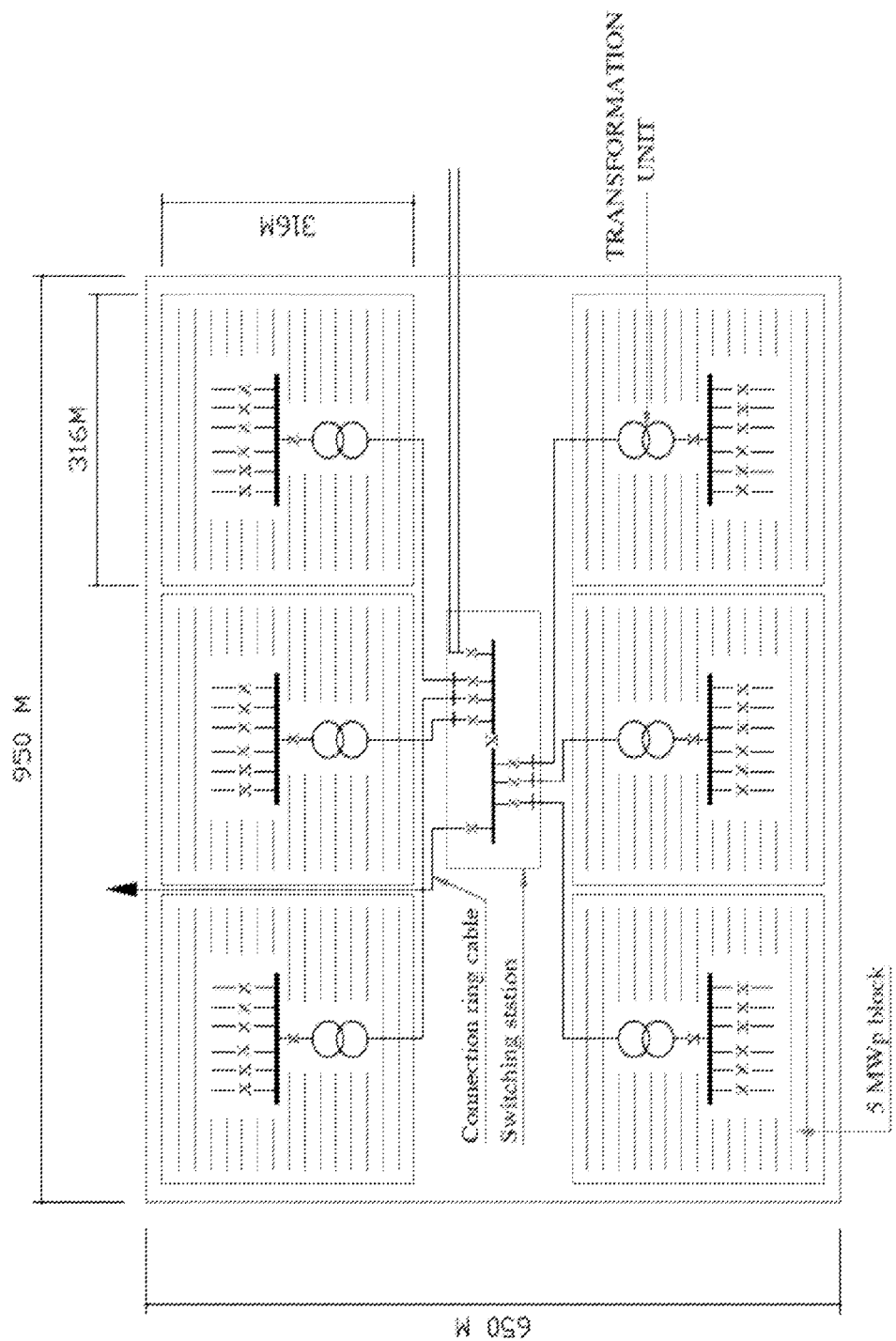
FIG. 5 illustrates an energy collection system of 5 MWp solar blocks comprising a switching station connecting 6 transformation units according to an embodiment of the invention.
Figure 6:
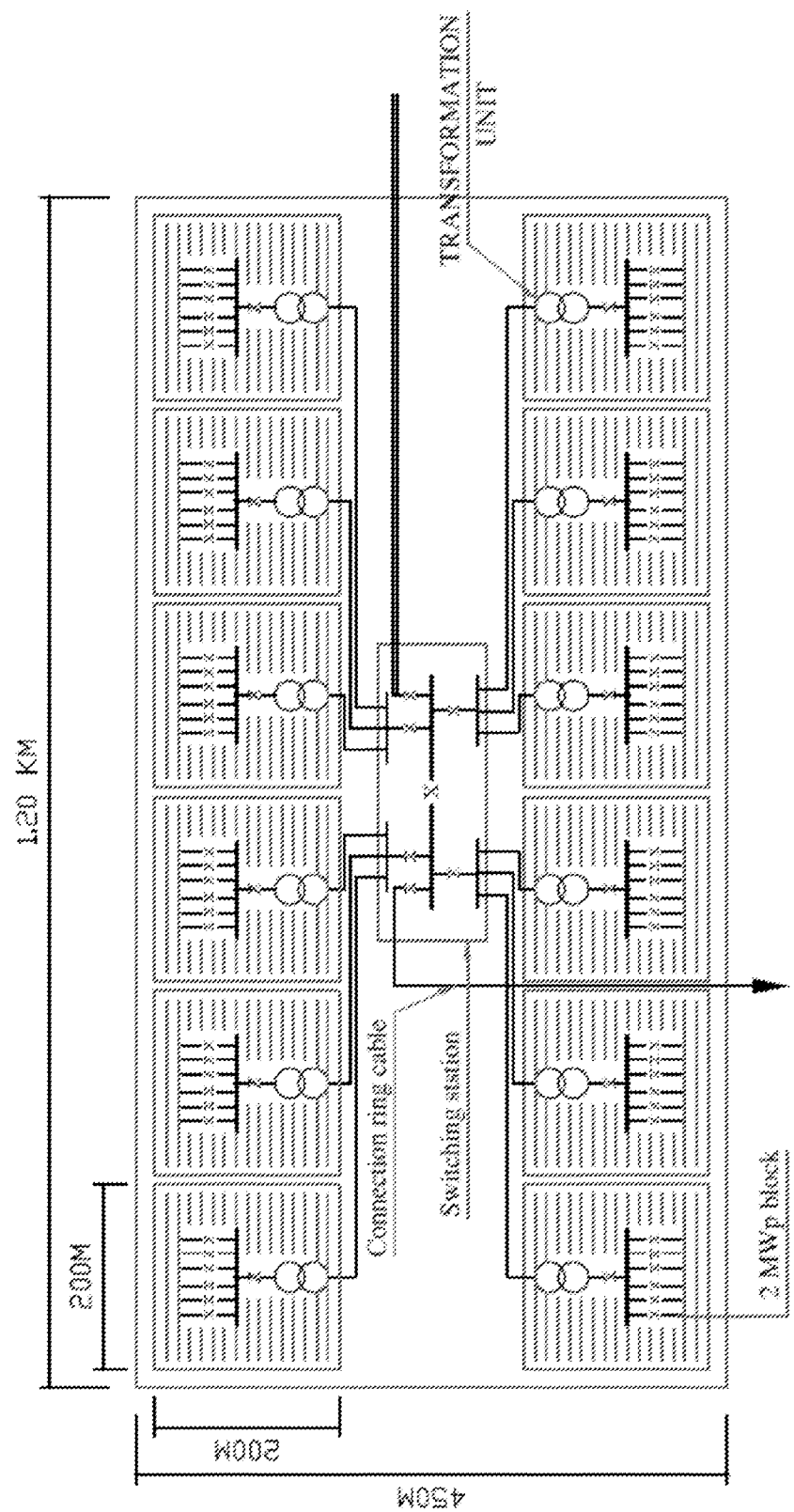
FIG. 6 illustrates an energy collection system of 2 MWp solar blocks with a reduced number of switchgears according to an embodiment of the invention. Three transformation units are connected to a single switchgear in each respective switching station.
Figure 7:
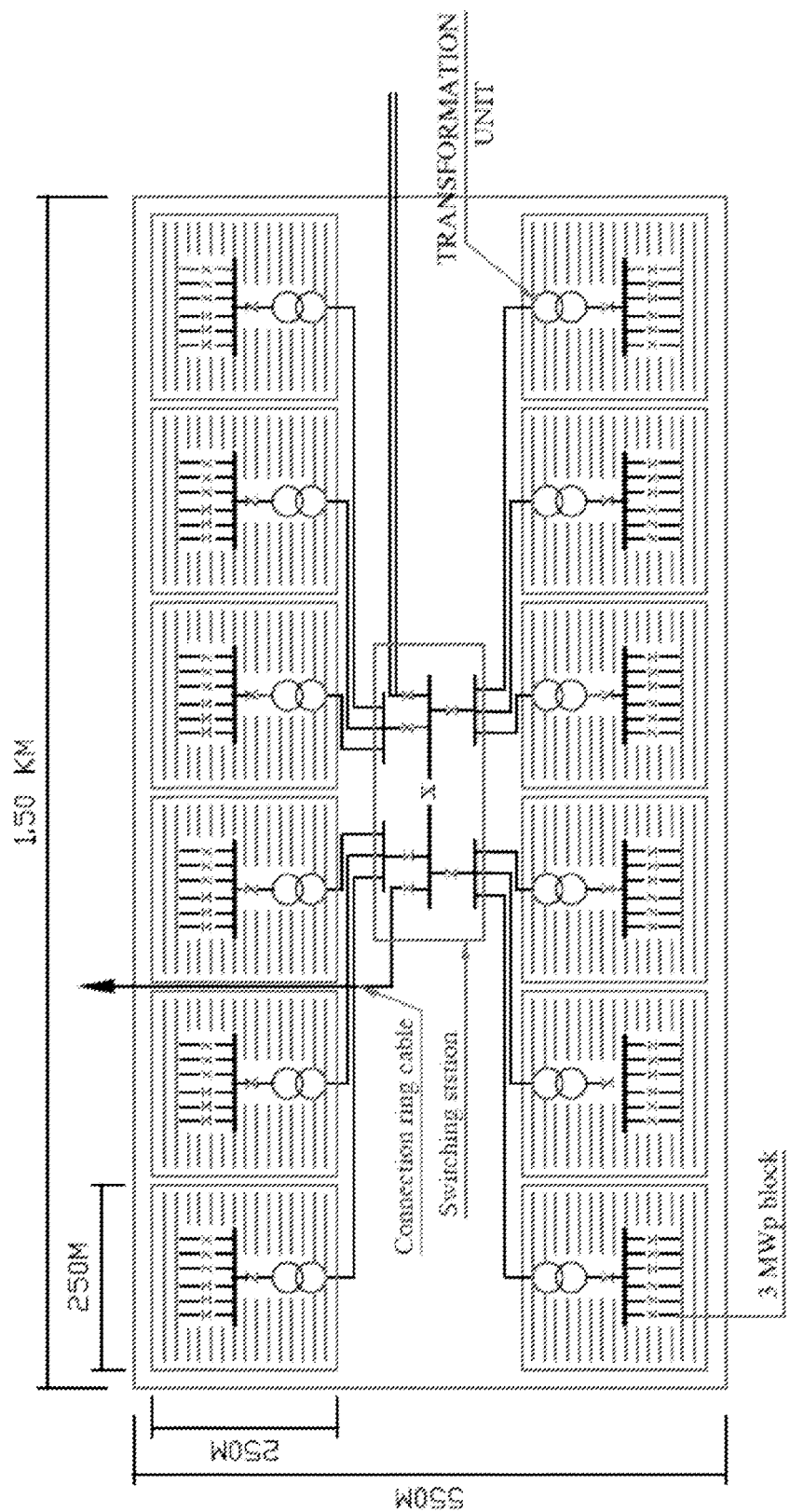
FIG. 7 illustrates an energy collection system of 3 MWp solar blocks with a reduced number of switchgears according to an embodiment of the invention. Three transformation units are connected to a single switchgear in each respective switching station.
Figure 8:
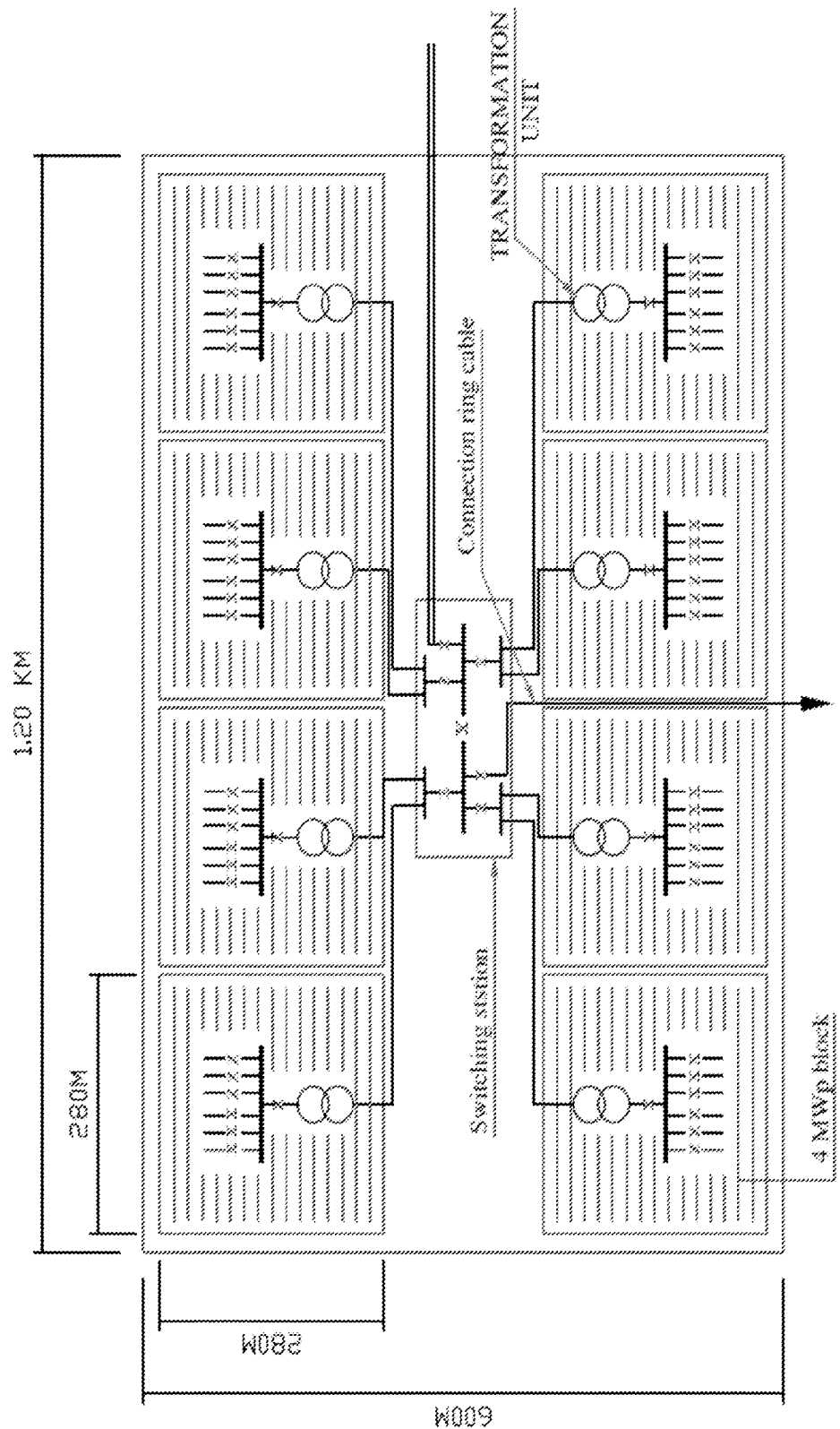
FIG. 8 illustrates an energy collection system of 4 MWp solar blocks with a reduced number of switchgears according to an embodiment of the invention. Two transformation units are connected to a single switchgear in each respective switching station.
Figure 9:
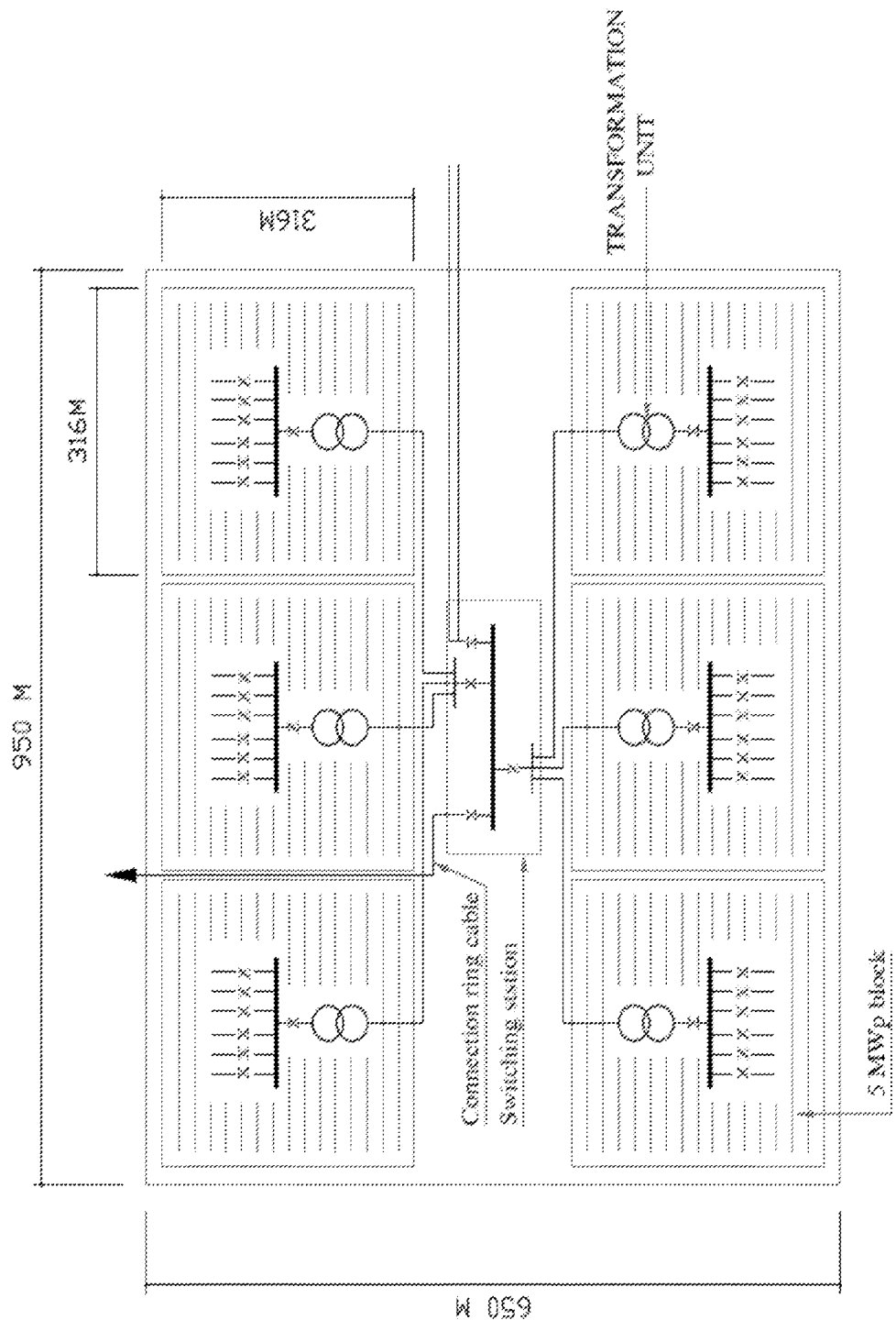
FIG. 9 illustrates an energy collection system of 5 MWp solar blocks with a reduced number of switchgears according to an embodiment of the invention. Three transformation units are connected to a single switchgear in each respective switching station.

Techniques adopted:
  Techniques used in developing this design comprise of:
  (a) Simplification
  (b) Standardization
  (c) Centralization
  d) Multiple configurations (ring and star)
  (e) Fully utilization
  (f) Technical and economical optimization
  (g) Redundancy.
  (h) Selection of components among the available standard products in the markets (no special order).
1.0 Invention Design Structure:
  Based on the new design structure of electrical balance of system for large scale renewable project, there will be five levels of design:
    1—Unit inverter system connection (0.1-1000 KW) (0.4-0.7 KV).
    2—Transformation unit (2-6 MW) (LV/MV).
    3—Switching stations (20-36 MW) (MV).

4—Sub transmission substation (100-500 MW) (MV/HV).

5—Main transmission substation (500-3000 MW) (HV/EHV).

Each higher level will connect several units of lower level.

Although the solution is designed primarily to replace the traditional design of energy collection system of large scale solar PV project, However it suits also other renewable project energy collection system, in general, and can provide similar advantages. The design structure levels will be described with respect to their application on solar PV project in detail, as an example. Also within the description, 33 KV voltage level is used for medium voltage (MV), 132 KV for high voltage (HV) and 400 KV for extra high voltage (EHV), as an example. Later, the application of the solution on some of remaining renewable project types will be described in brief.

Application of Design Structure on Large Scale Solar PV Project:

Based on the proposed design concept, solar PV panels and inverters are connected to gather in the form of solar power generation blocks of 2, 3, 4 or 5 MW rated power. Each of these blocks generates electricity at low voltage level and associated to its electrical transformer, transformation unit, to step up voltage to medium voltage level. Multiple of these blocks are connected by means of medium voltage (MV) radial cables to their respective switching station. Each two switching stations or more are connected in series to the sub-transmission substation (HV). Several sub-transmission substations are connected to one main transmission substation (EHV). The description of application of design structure levels of energy collection system on large scale solar PV projects are demonstrated as follows:

1. Unit Inverter System Connection (0.1-1000 KW) (0.4-0.7 KV):

The unit inverter connection describes the cable connection between solar PV technologies like solar panels and solar inverters with the transformation unit. The DC & AC cables are connecting solar technologies with transformer room can be illustrated in these configurations:
1—Using micro inverters (0.1-1 KW): with ac cables, distribution/collection boards and LV feeder pillars.
2—Using string inverters (2-100 KW): with dc cables, string inverters, ac cables and LV feeder pillars.
3—Using out-door central inverters (100-1000 KW): with DC cables, DC combiner boxes, outdoor central inverter and ac cables.
4—Using stationary inverters with DC cables and combiner boxes.

An appropriate size of all above mentioned electric elements will be used in creation of the system.

2. Transformation Unit (2-6 MW) (LV/MV):

The transformation unit consists of:
1—A step-up transformer: (0.4-0.7)/33 KV, having a transformer capacity: 2 MVA, 3 MVA, 4 MVA, 5 MVA & 6.3 MVA.
2—A low voltage panel: enclosure with bus-bar that connecting ACB & row of MCCBs to gather.

3D drawing of transformation unit including transformer and LV panel with its ACB and different sizes of MCCBs can be viewed in FIG. 1.

Each transformation unit will be connected via MV radial cable to switching station. The radial cable has different cable sizes based on the size of transformation unit. For example 2 MVA, 3 MVA, 4 MVA, 5 MVA & 6 MVA will use 3C×(70, 95, 120, 150, 185)mm$^2$ of 33 KV AL/XLPE/SWA cable respectively.

3. Switching Stations (20-36 MW) (MV):

The switching stations consist of a medium voltage (33 KV) switchgear board that includes 2 main outgoing feeders, several incomer feeders and in some cases a bus-section. All other station auxiliary devices are included in switching station room. Multiple of solar PV power blocks are connected by means of medium voltage (MV) transformers and MV radial cables to switching station.

The system has been categorized into four categories based on the Size of transformation unit of solar block. These categories are 2 MWP, 3 MWP, 4 MWP, 5 MWP solar power blocks.

Examples of switching stations and their solar blocks categories are illustrated in FIGS. 2 to 5 as design examples for 2 MW, 3 MW, 4 MW and 5 MW categories, respectively.

An optional switching station design for cost reduction purpose is obtained by reducing the number of switchgears in the switching station through connecting more transformation units to one MV switchgear. This option is shown in FIGS. 6 to 9, where a design examples for 2 MW, 3 MW, 4 MW and 5 MW categories with reduced number of switchgears are illustrated, respectively.

Each switching station is connected with the sub transmission substation via primary MV cable. Proposed primary cable has the size of 2×3×1C×630 MM2 33 KV CU/XLPE/SWA. Current rating is: 2×630 A=1260 A (72 MVA), or its equivalent of aluminum conductor cable.

Each two switching stations or more are connected together via secondary MV cable. Secondary MV cable has this size of 3×1C×630 MM2 33 KV CU/XLPE/SWA. Current rating: 630 A (36 MVA), or its equivalent of aluminum conductor cable.

Figure 10:
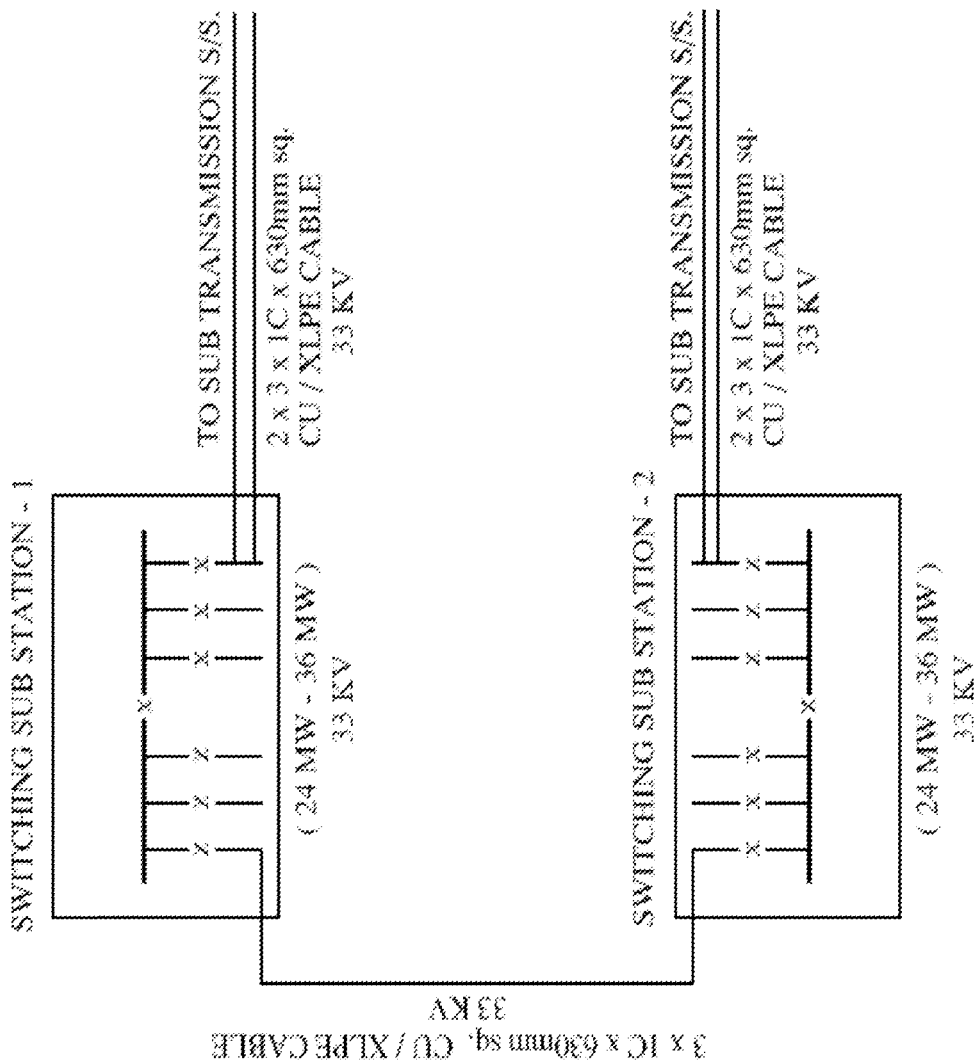
FIG. 10 illustrates an energy collection system comprising primary and secondary cables connecting first and second switching stations as a ring, closed loop, to the sub-transmission substation according to an embodiment of the invention.

Primary and secondary cables connect switching stations as a ring to the sub-transmission substation as illustrated in FIG. 10.

In normal situations the efficiency of design is high because the primary cables are double in size of the secondary cable. This is done in order to create redundancy for energy transfer in case of any failure in any primary cable. In fact, in case of failure of one of the primary cables or a part of one of the switching substations, the energy can be transported by the secondary cable to the next switching substation and via the other primary cable to the sub-transmission substation. Extra switchgear in the sub transmission substation is not necessary for this redundancy.

4. Sub-Transmission Substation (100-500 MW) (MV/HV):

All switching stations will be connected to sub-transmission substation via MV primary cables. Four primary cables can be brought together to a sub transmission substation where the received power on medium voltage (33 KV) is transformed up to high voltage (132 KV). This way, as a whole, a 100 to 120 MW solar energy generation plant is connected to the 132 KV grid, as illustrated in FIG. 11.

Figure 11:
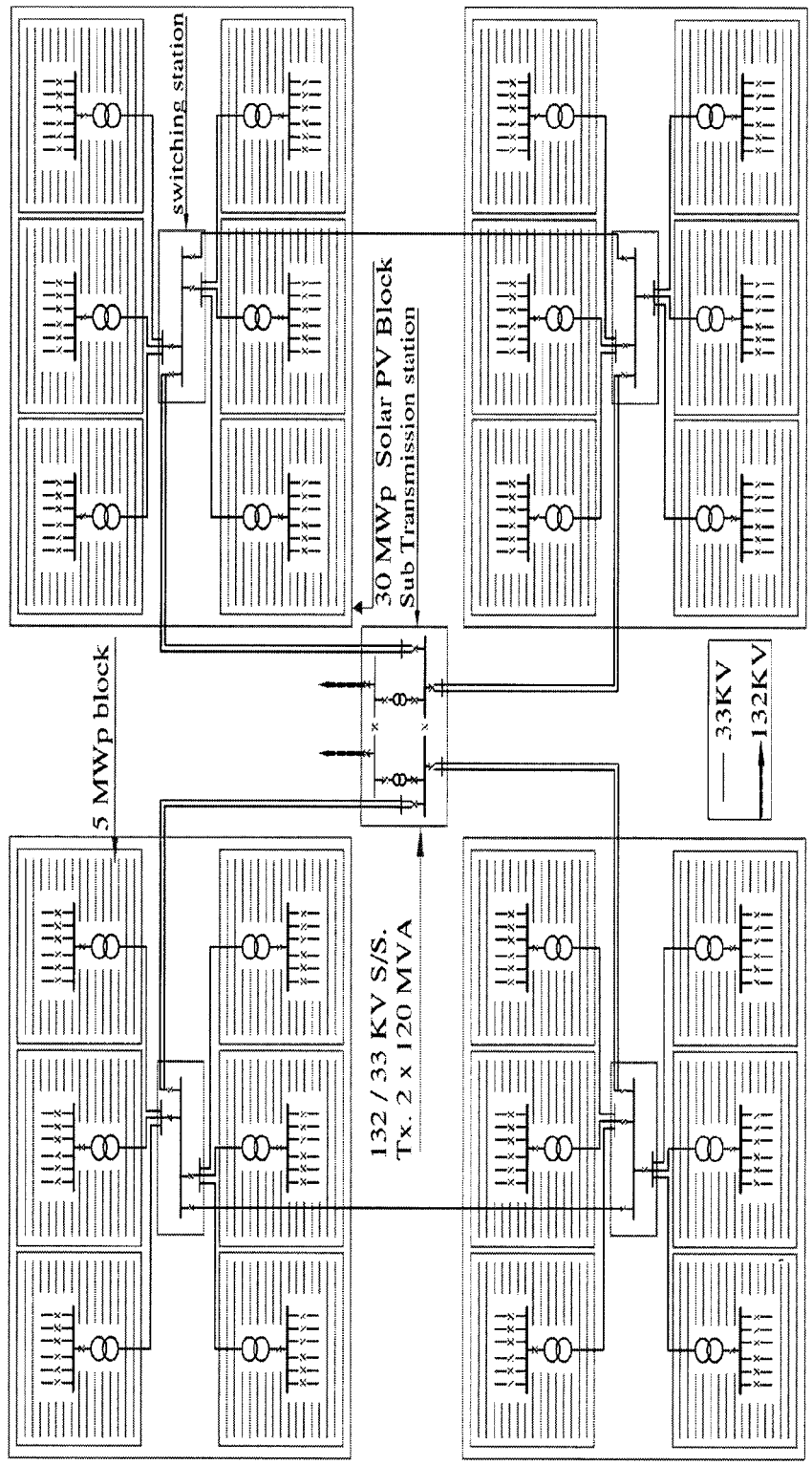
FIG. 11 illustrates an energy collection system with all the switching stations connected to the sub-transmission substation in the centre via primary cables according to an embodiment of the invention.
Figure 12:
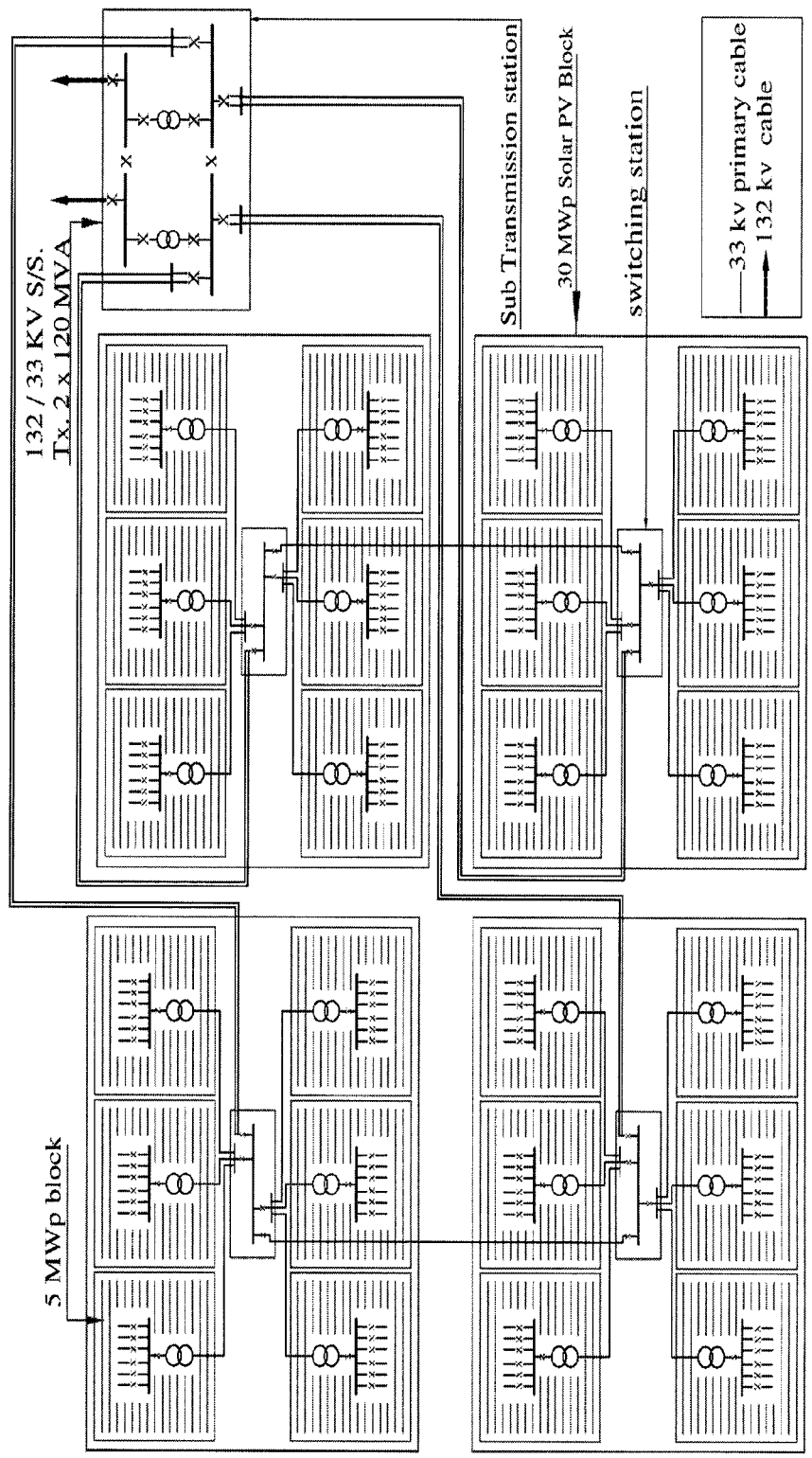
FIG. 12 illustrates an energy collection system of 120 MWp solar PV project layout with the sub-transmission substation located at the corner of the project rather than in the centre according to an embodiment of the invention.

FIG. 12 shows the 120 MWp solar PV project layout with the sub-transmission substation located at the corner of the project rather than in the centre as shown in FIG. 11.

Figure 13:
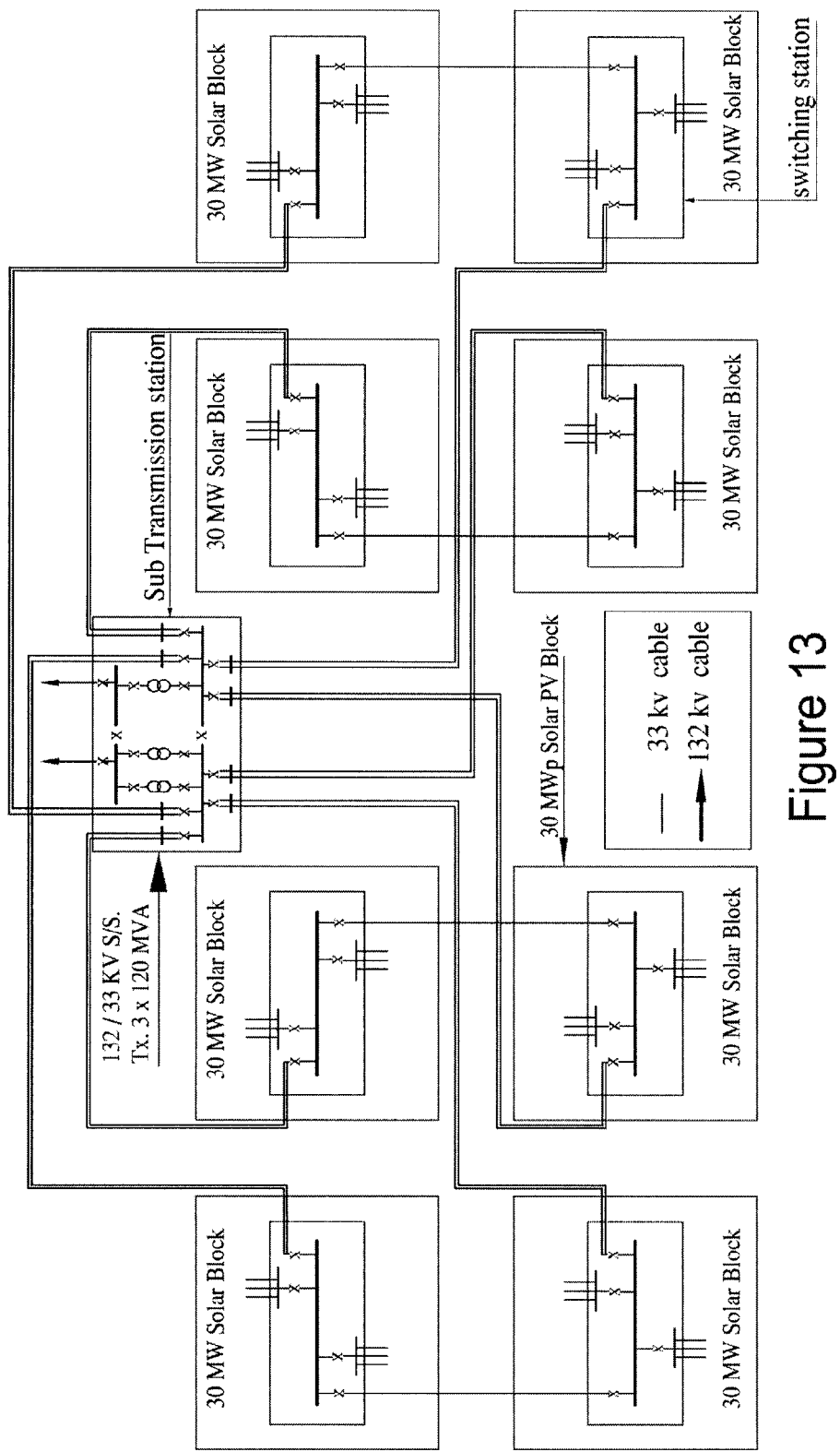
FIG. 13 illustrates an energy collection system of 240 MWp solar PV project layout comprising 8 switching stations based on the new conceptual design according to an embodiment of the invention.

A 132 KV transmission substation can be loaded up to 240 MW as shown in FIG. 13.

Figure 14:
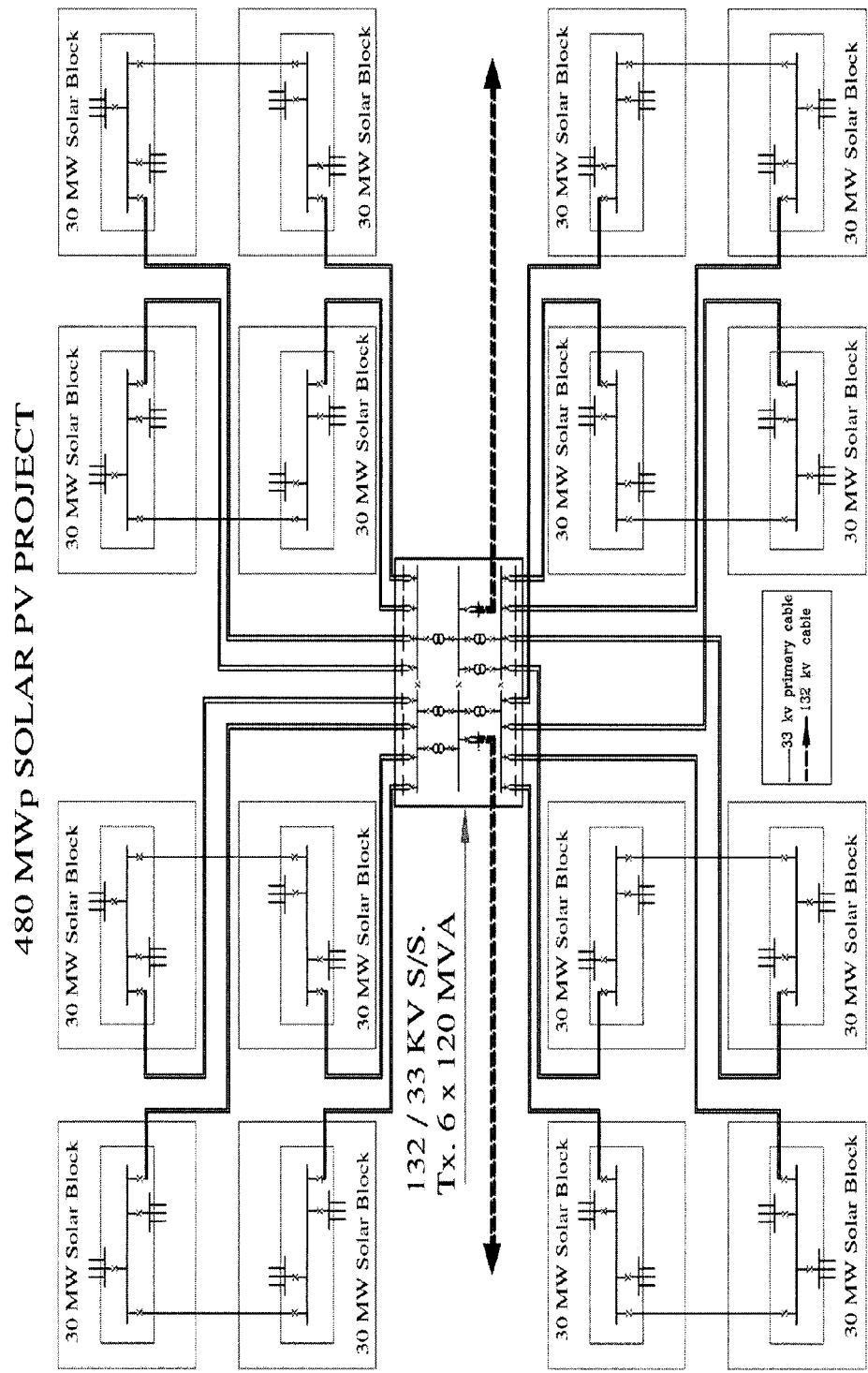
FIG. 14 illustrates 480 MWp solar PV project layout comprises 16 switching stations based on the new conceptual design according to an embodiment of the invention.

A full utilization of 132 KV transmission substation can be achieved by adding second medium voltage (33 KV) bus-bar switchgear board to double capacity to 480 MW as shown in FIG. 14.

5. Main Transmission Substation (500-3000 MW) (HV/EHV):

Several sub-transmission substations are connected via high voltage cable or over head lines to main transmission substation.

In the main transmission substation, power with voltage of 132 KV is transformed to power with voltage of 400 KV as an extra high voltage level (EHV).

Figure 15:
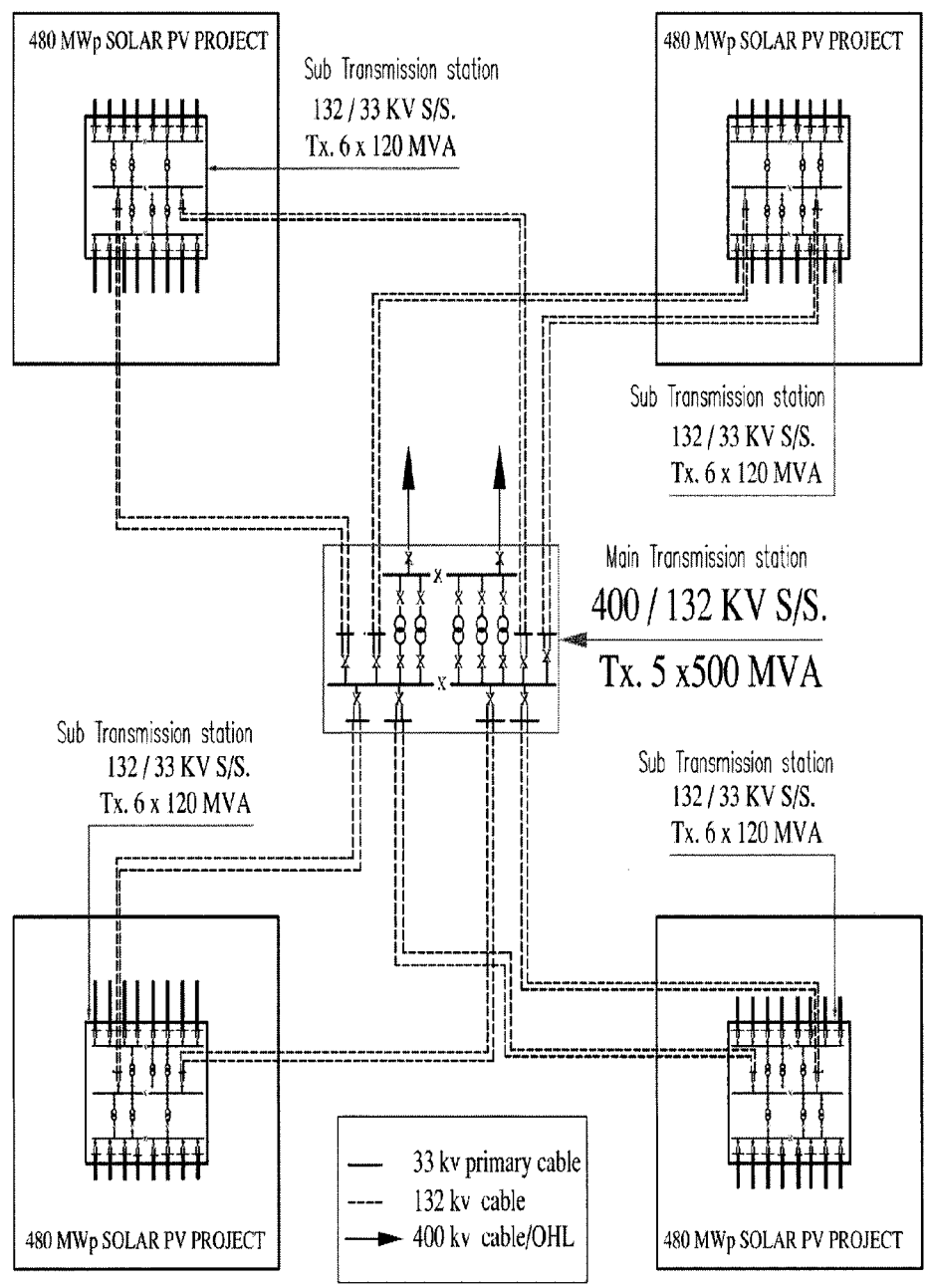
FIG. 15 illustrates 1920 MWp solar PV project layout comprises 64 switching stations based on the new conceptual design according to an embodiment of the invention.

The main transmission substation can handle power from four sub transmission substation each of 500 MW on the same high voltage bus bar (132 KV) to reach up to 2000 MW as shown in FIG. 15.

Figure 16:
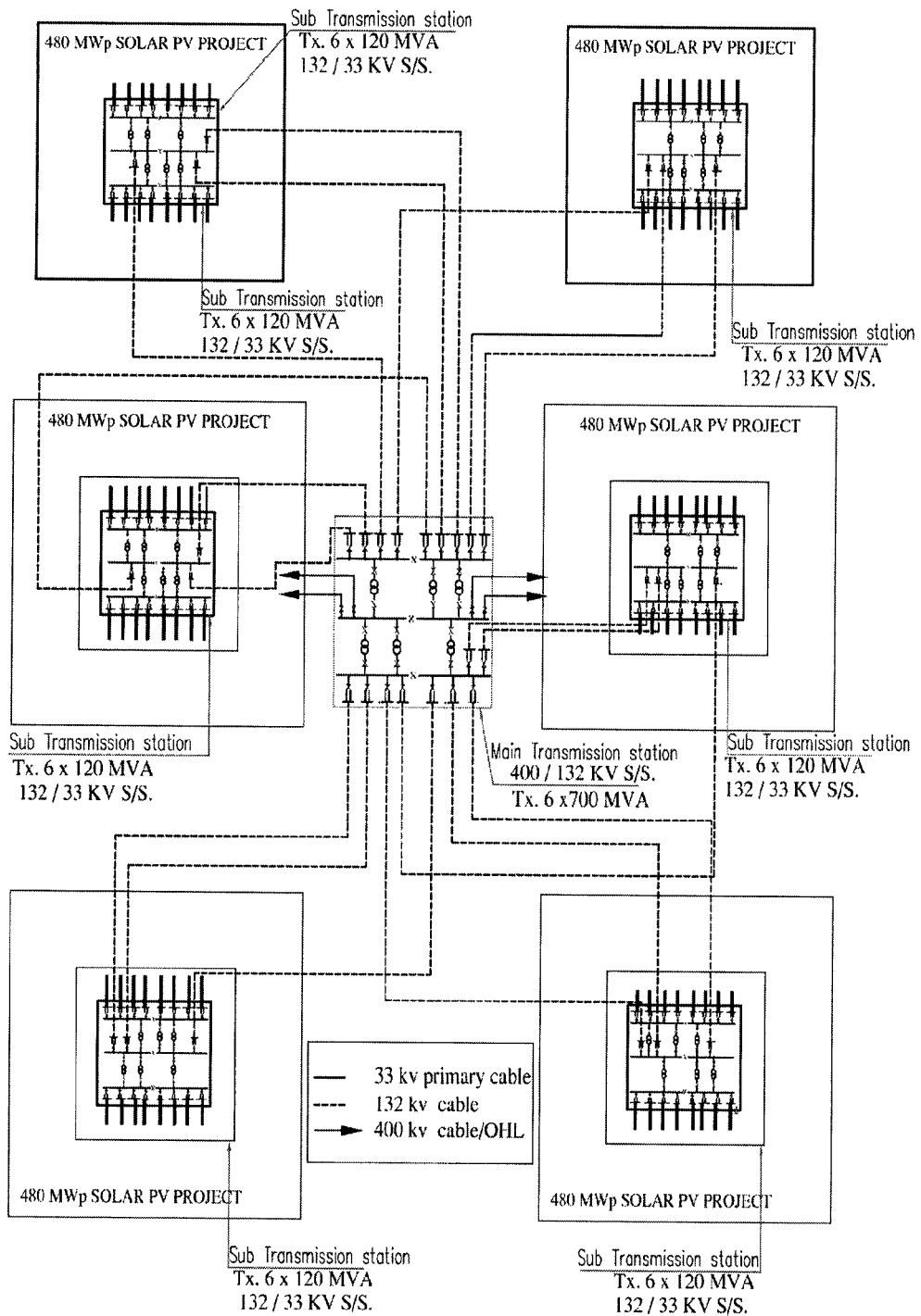
FIG. 16 illustrates 2880 MWp solar PV project layout comprises 96 switching stations based on the new conceptual design according to an embodiment of the invention.
Figure 17:
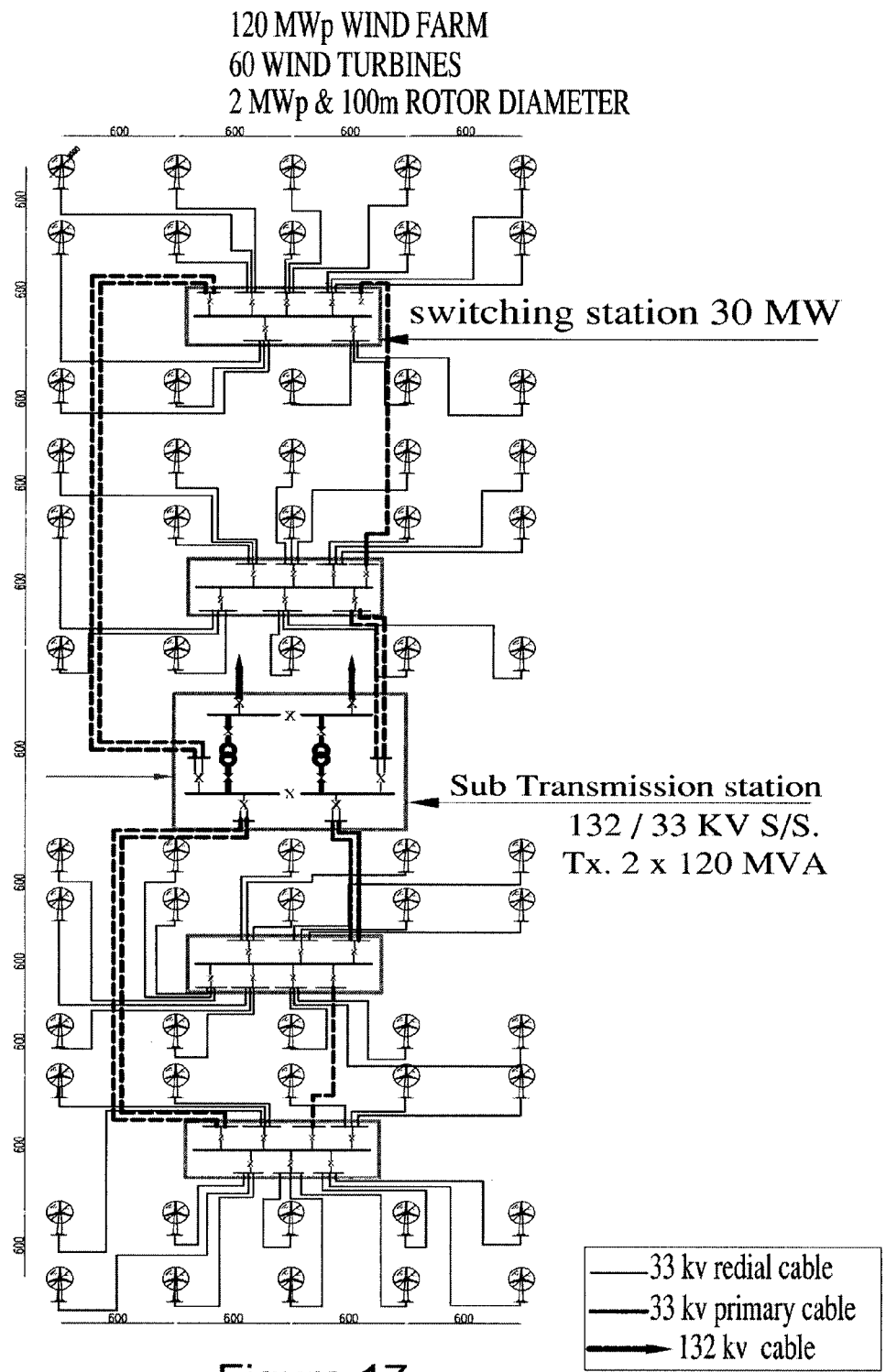
FIG. 17 illustrates 120 MWp wind farm using 60 wind turbines of 2 MWp capacity each. It comprises 4 switching stations and one sub-transmission substation in the center.
Figure 18:
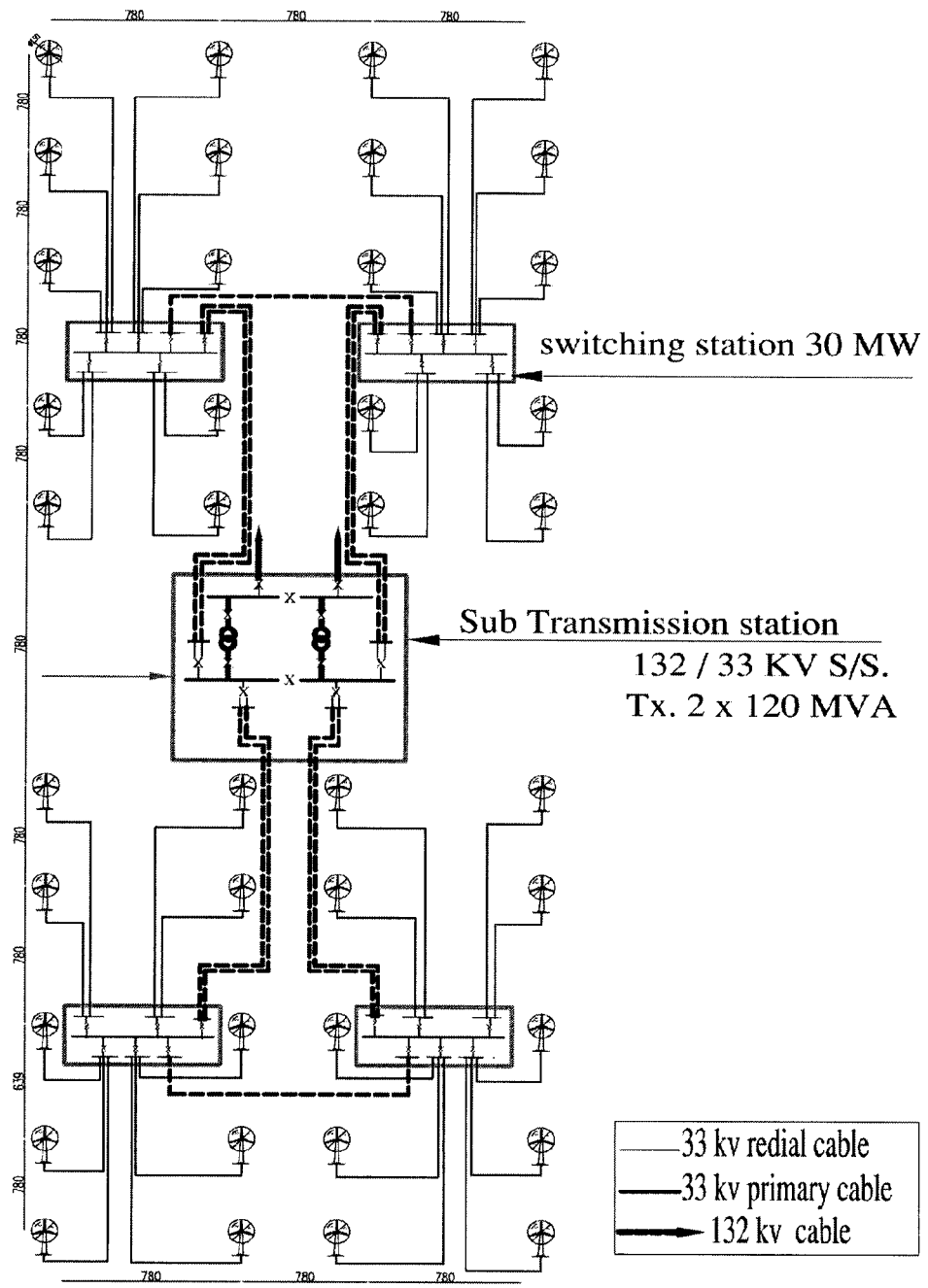
FIG. 18 illustrates 120 MWp wind farm using 40 wind turbines of 3 MWp capacity each. It comprises 4 switching stations and one sub-transmission substation in the center.
Figure 19:
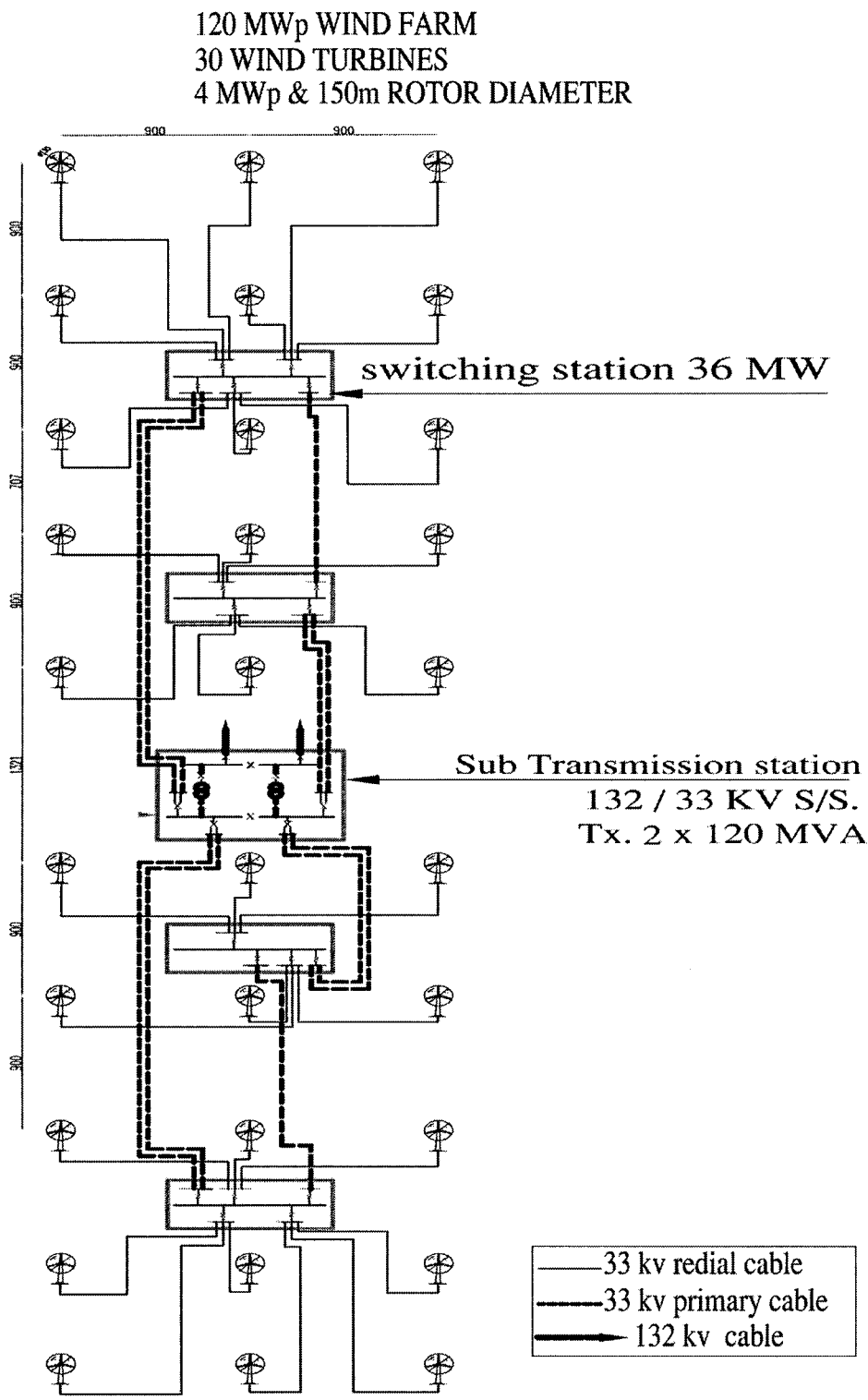
FIG. 19 illustrates 120 MWp wind farm using 30 wind turbines of 4 MWp capacity each. It comprises 4 switching stations and one sub-transmission substation in the center.
Figure 20:
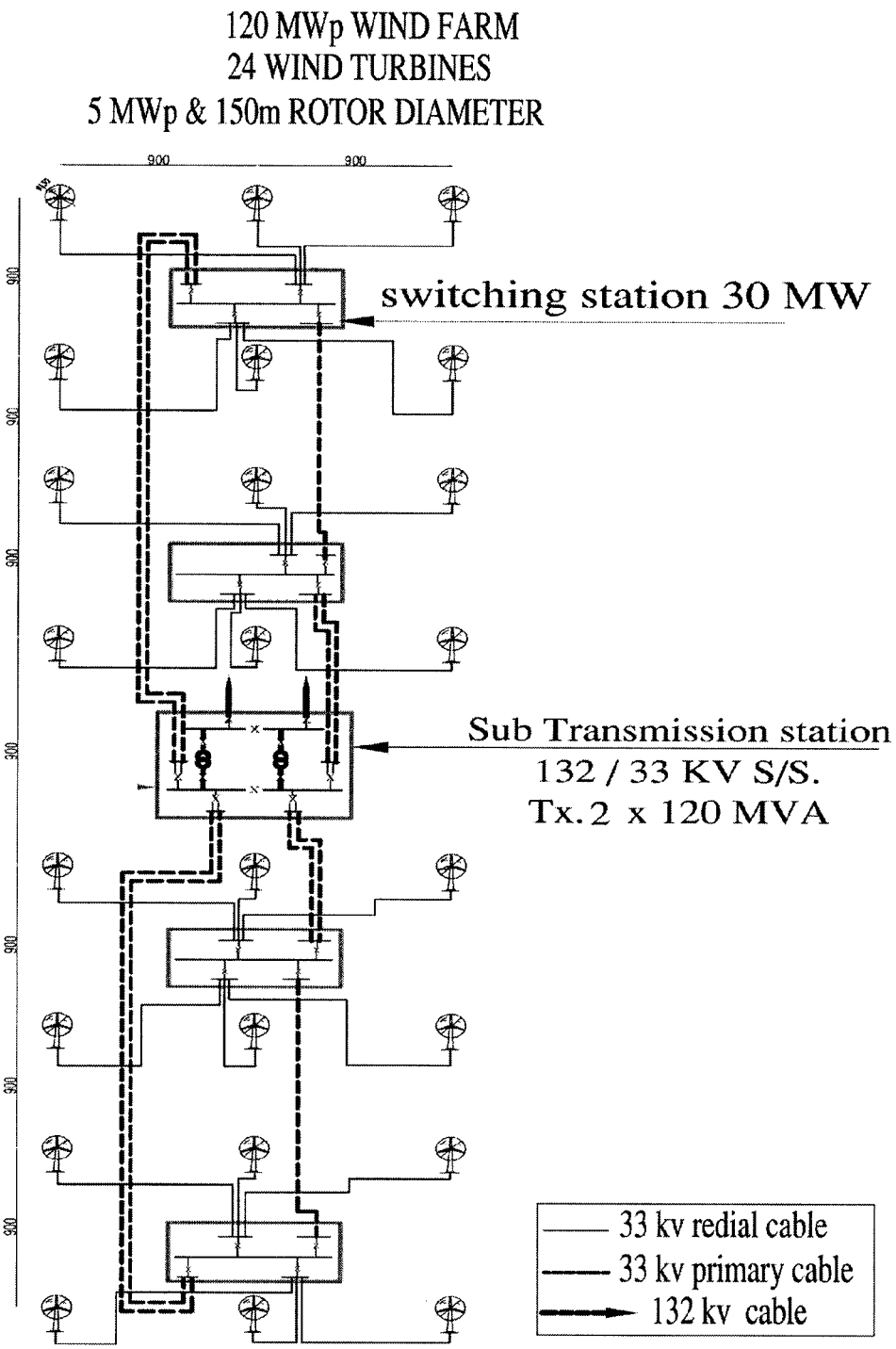
FIG. 20 illustrates 120 MWp wind farm using 24 wind turbines of 5 MWp capacity each. It comprises 4 switching stations and one sub-transmission substation in the center.
Figure 21:
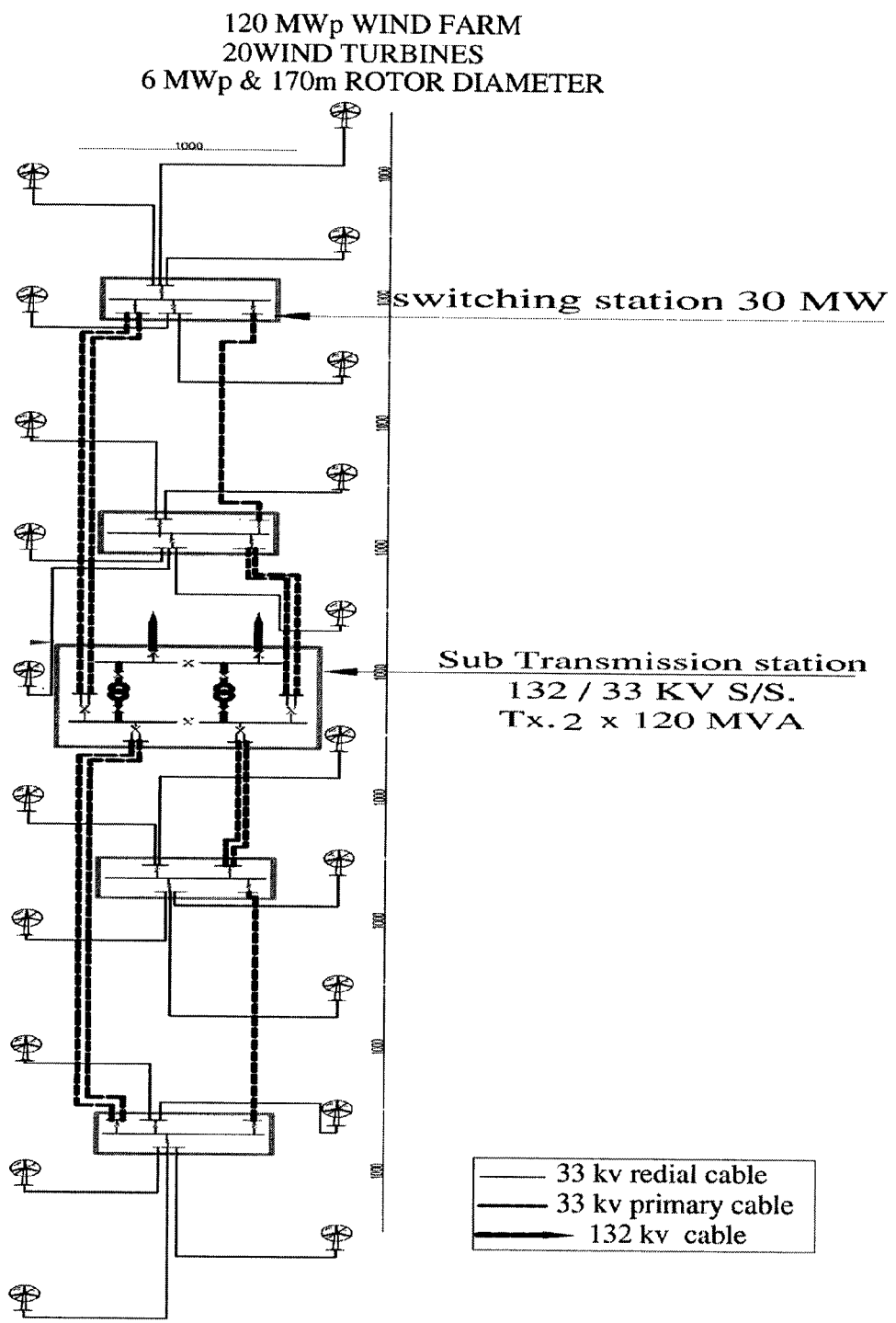
FIG. 21 illustrates 120 MWp wind farm using 20 wind turbines of 6 MWp capacity each. It comprises 4 switching stations and one sub-transmission substation in the center.
Figure 22:
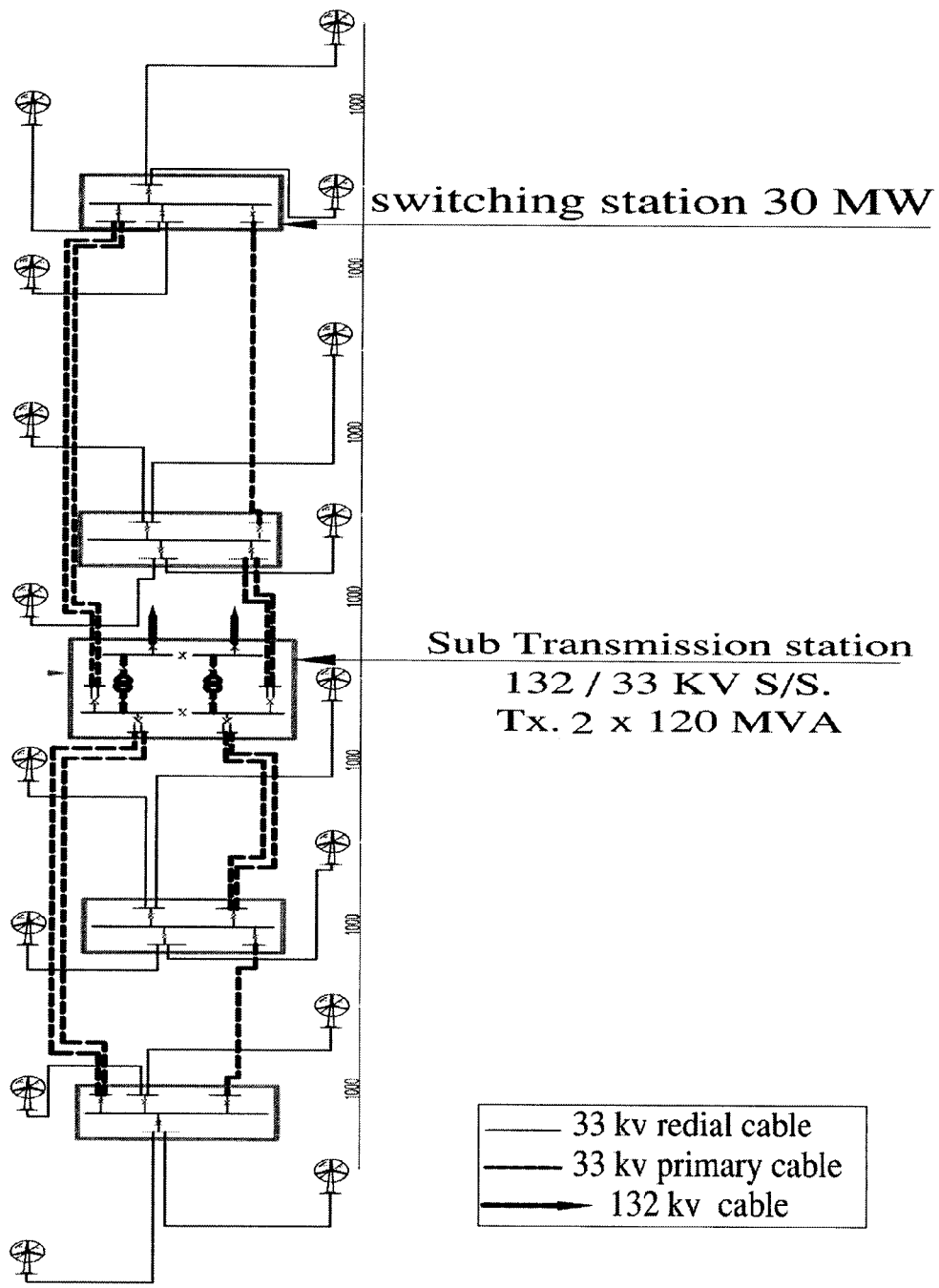
FIG. 22 illustrates 120 MWp wind farm using 16 wind turbines of 7.5 MWp capacity each. It comprises 4 switching stations and one sub-transmission substation in the center.
Figure 23:
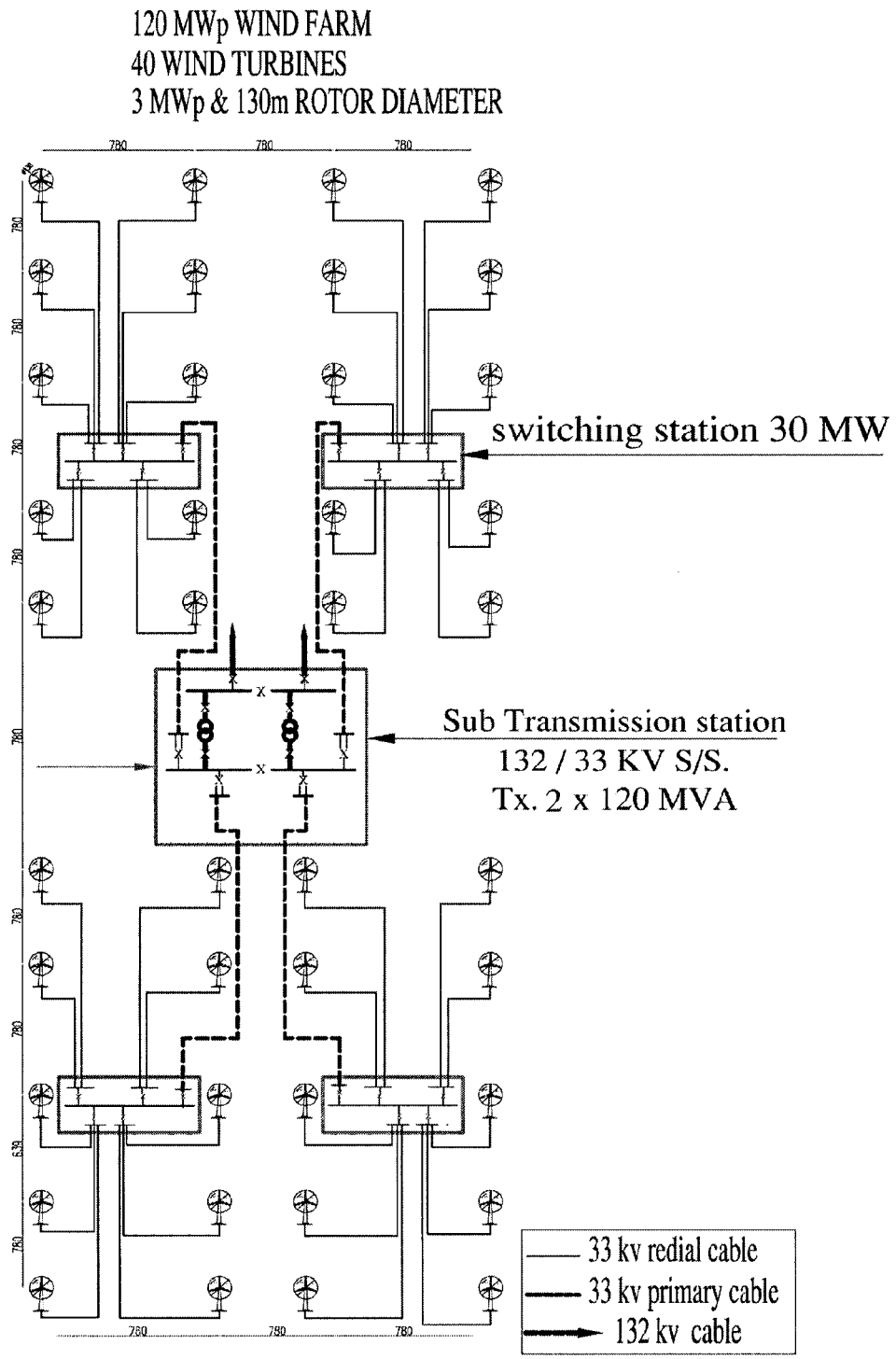
FIG. 23 illustrates 120 MWp wind farm using 40 wind turbines of 3 MWp, without redundancy (secondary) cable between the two switching stations.
Figure 24:
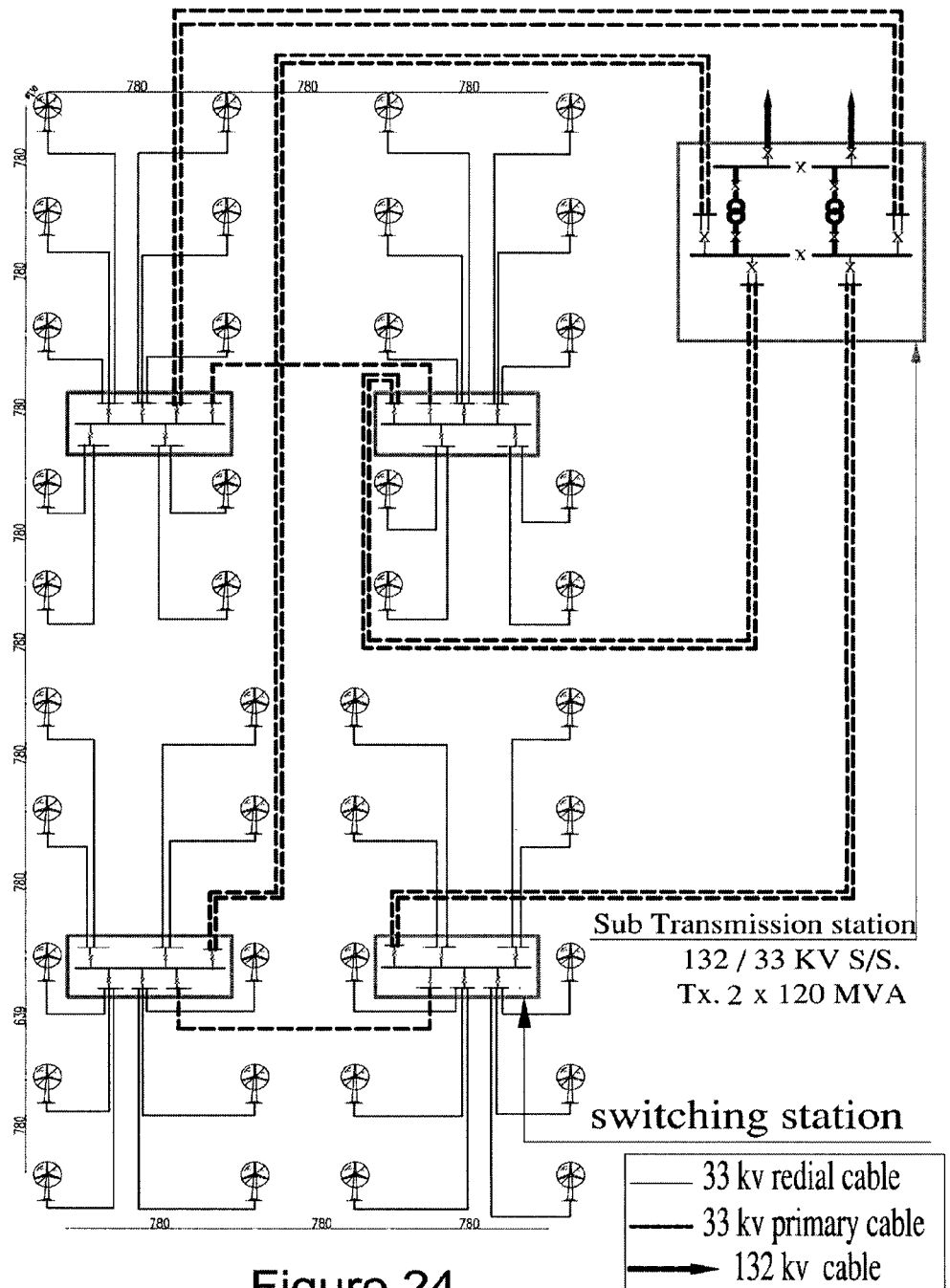
FIG. 24 illustrates 120 MWp wind farm using 40 wind turbines of 3 MWp, with sub-transmission substation at the corner.
Figure 25:
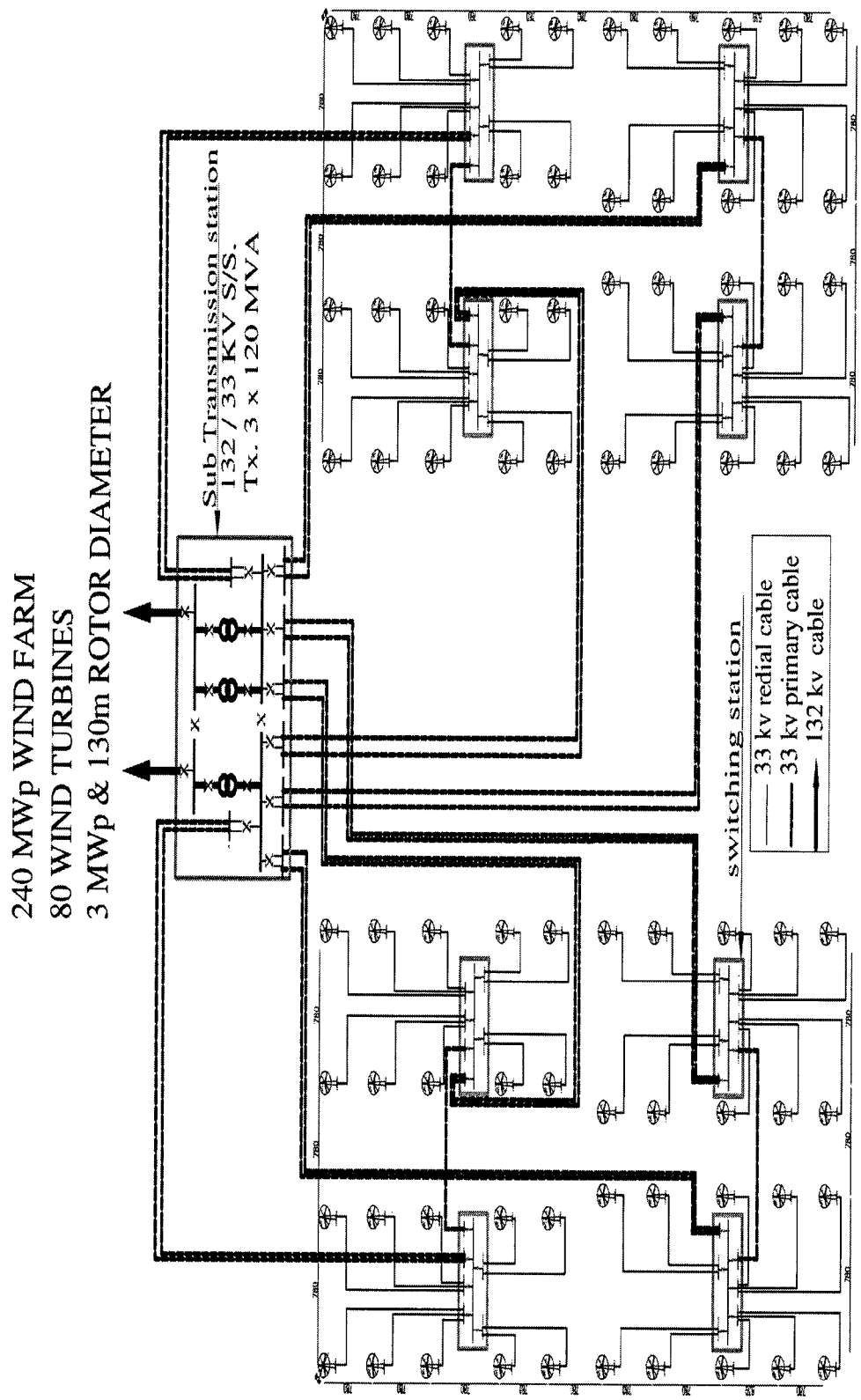
FIG. 25 illustrates 240 MWp wind farm using 80 wind turbines of 3 MWp capacity each. It comprises 8 switching stations and one sub-transmission substation.
Figure 26:
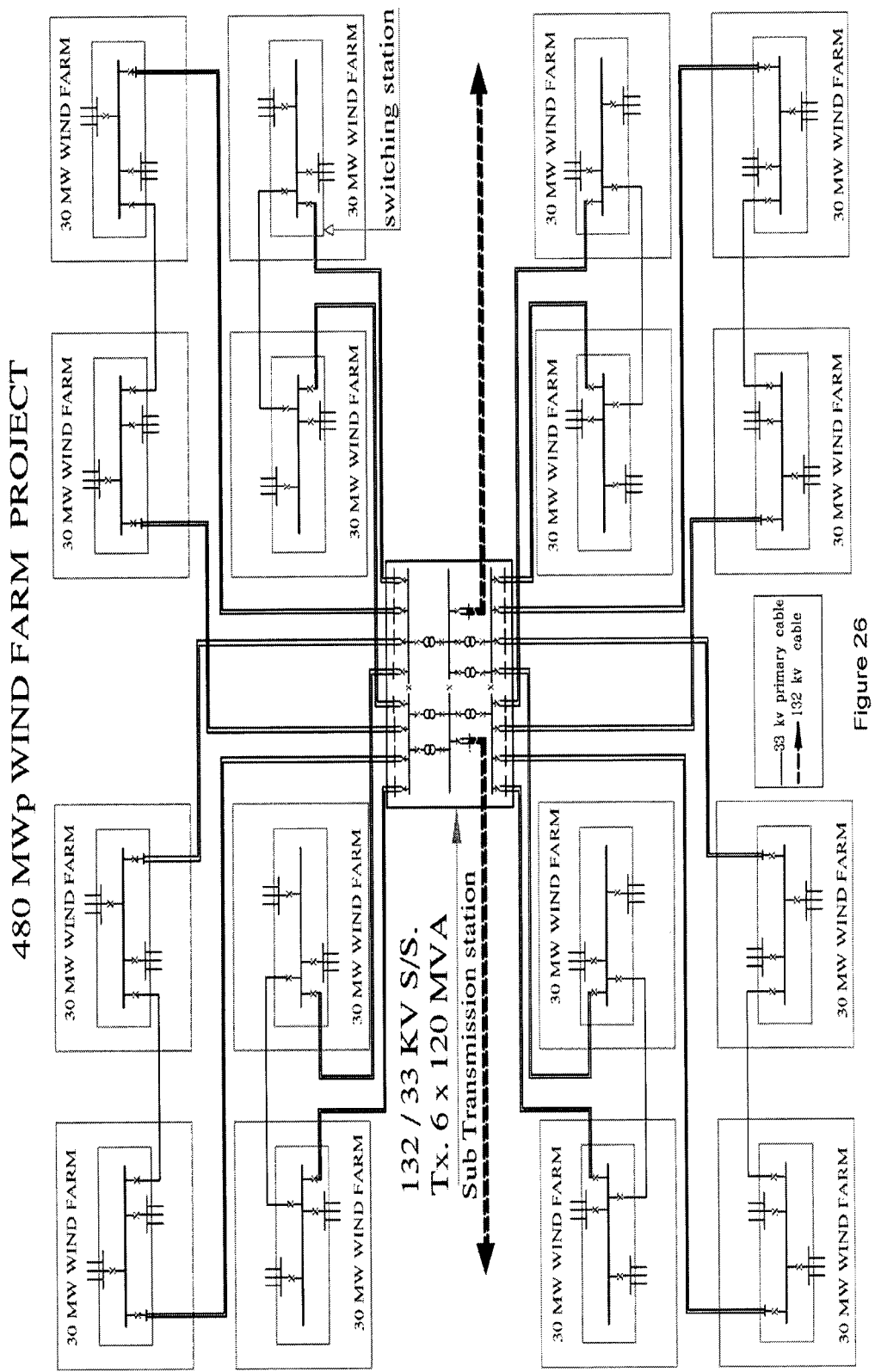
FIG. 26 illustrates 480 MWp wind farm using 160 wind turbines of 3 MWp capacity each. It comprises 16 switching stations and one sub-transmission substation in the center.
Figure 27:
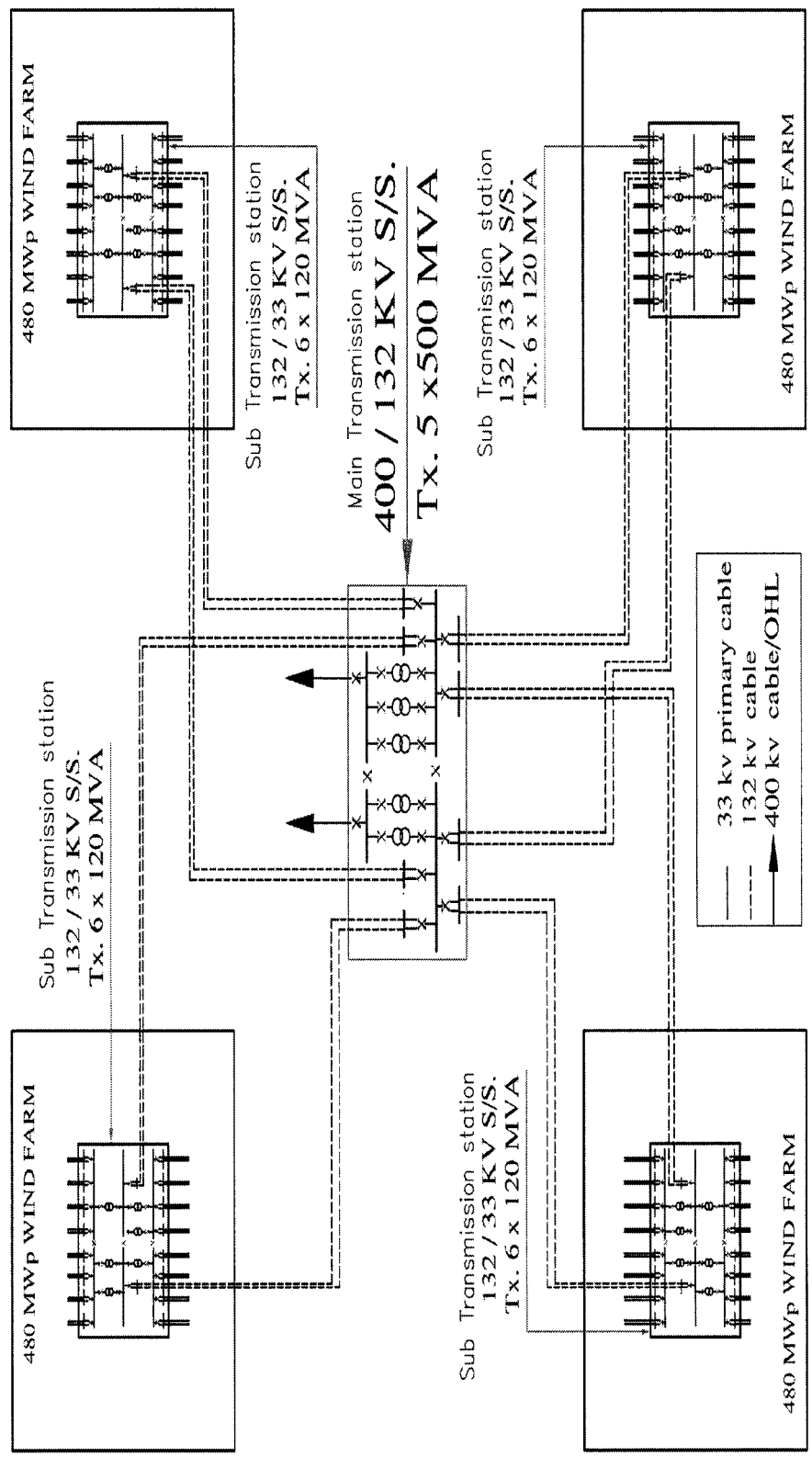
FIG. 27 illustrates 1920 MWp wind farm using 640 wind turbine of 3 MWp capacity each. It comprises 64 switching stations, 4 sub-transmission substations and one main transmission substation in the middle.
Figure 28:
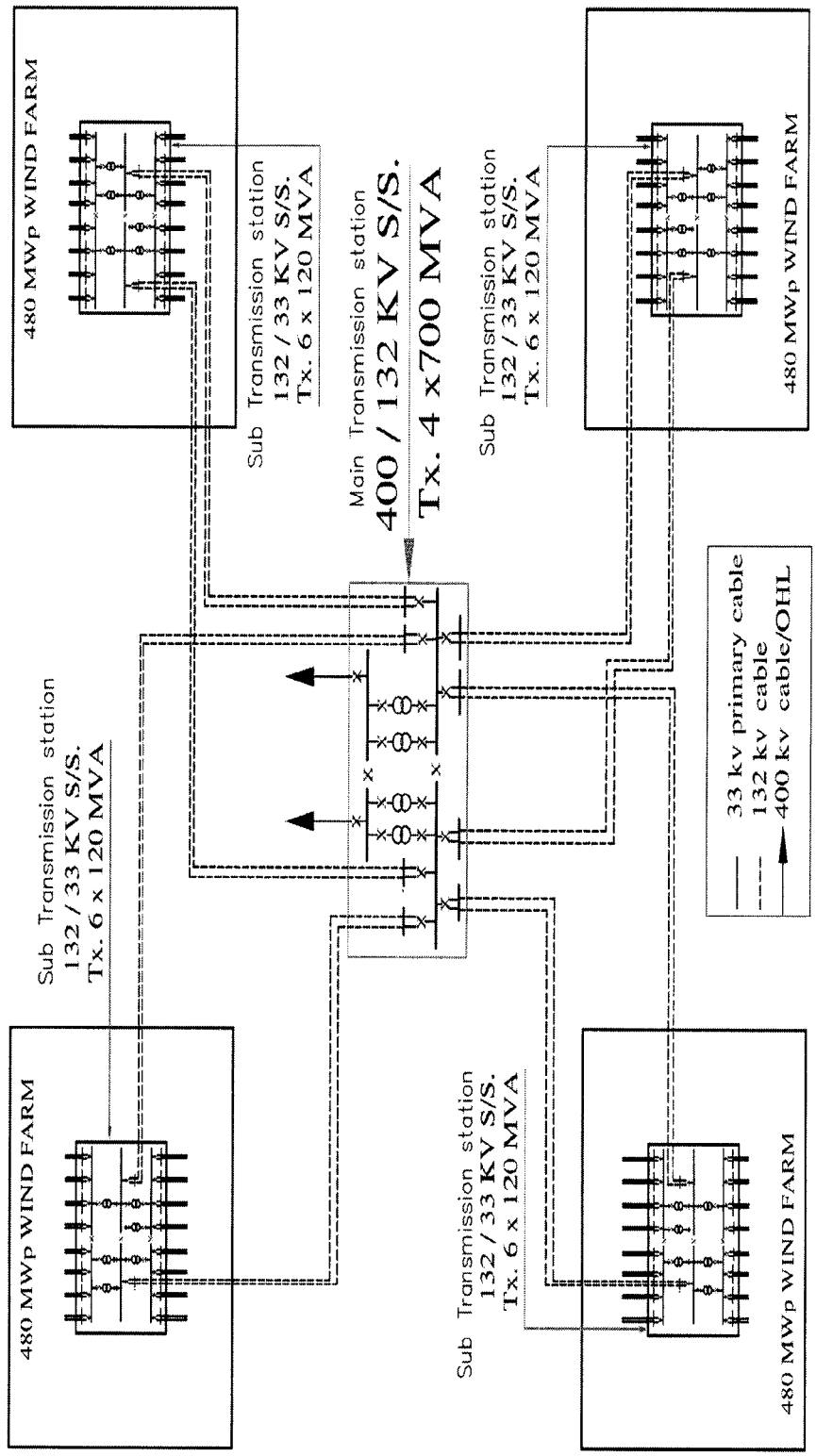
FIG. 28 illustrates 1920 MWp wind farm using 320 wind turbine of 6 MWp capacity each. It comprises 64 switching stations, 4 sub-transmission substations and one main transmission substation in the middle.

If an additional bus-bar switchgear board is added in parallel, the transmission capacity can be increased up to 3000 MW including 6 sub-transmission substations each of 500 MW as shown in FIG. 16.

3.0 Energy Collection System Components Description and Design Decisions Justification (with Reference to Large Scale Solar PV Project and from Larger Level to Smaller Element):

Transmission System for Large Scale Renewable Project:

It consists of transmission substations and transmission lines that are required to receive the generated energy from energy collection system of large scale renewable project in bulk amount and transmit it to area of demand. The design of main transmission substation and sub-transmission sub-station that are required to deal with large amount of power from 100 MW to 3000 MW are consider in the study.

The transmission system design is similar to traditional one, but a technical and economical optimization techniques have been included to make it suits large scale renewable project in very efficient and cost effective way. The design should give the lowest $c/Wp cost without compromising with the quality, reliability or contingency.

In large scale solar project, the required investment for internal transmission network is huge and its cost weight might be closer to the solar project itself which might be a barrier for project enlargement. In this case sizing and optimizing of the required transmission asset with the proposed solar project size is important.

Considering the proposed solar technologies and energy collection system, a design for sub-transmission and main transmission substations and their associated transmission lines have been carefully adjusted to obtain high profile, high capacity and well utilized transmission system at minimum cost.

Switching Station:

The switching station is mainly contains a board of switchgears which control the connection of radial transformation units that located in the middle of the solar blocks. Switchgear board usually consists of several switchgears including 2 main outgoings, few incomer feeder switchgears in addition to the bus section switchgear. The switching station contains also, SCADA RTU, battery and battery charger and other auxiliaries. The low voltage supply of switching station building can be fed from the LV panel of nearest transformation unit and backed-up by with supply from LV panel of second nearest transformation unit that is connected to second part of bus-bar with interlocking between both supplies. Batteries are available for dc supply and emergency feeding.

The proposed main outgoing of the switching station is connected directly to the sub transmission substation with cable of two set of 3×1C×630 mm² CU/XLPE/SWA 33 KV (double cable) which has double capacity (72 MVA) of all solar blocks connected with switching station (24-36 MW) to carry additionally the energy produced at the neighbor switching station in case of any failure in its main outgoing feeder since the two switching stations are connected to each other by 3×1C×630 mm² CU/XLPE/SWA 33 KV cable having a capacity of 36 MVA (secondary outgoing cable).

The idea behind this interconnection is to reduce the number of switchgears required in sub transmission substation.

Transformation Unit:

The transformation unit is connected by radial medium voltage cable to the switching station. The transformation unit is composed of an electric transformer coupled solidly with its Low Voltage panel by bus duct. The transformation unit (transformer and LV panel) will be installed together on the top of a concrete foundation and encapsulated by GRP enclosure that has ventilation from all directions to cool the unit. The GRP enclosure has pre-molded parts that can be assembled together at site on a base of concrete foundation which also has an access for cables.

Parts of Transformation Unit:

1—MV Radial Cables:

MV. Radial cables connect the transformation units with the switching station in radial connection (star). They are proposed to be a three core 33 KV cable made of Aluminum conductor at different cross section sizes of 70, 95, 120 and 150 mm² to fit with transformer capacities of 2 MVA, 3 MVA, 4 MVA, 5 MVA respectively. It was decided to be made from Aluminum rather than Copper due to the significant cost reduction compared to the equivalent rating of copper cables, and there is no fear from voltage drop as they are operating on high voltage (33 KV) for short distance (<1 KM).

Benefits of Using Radial Transformation Unit

There are several kinds of advantages that can be obtained from such design:

1. Using only one switchgear to operate a transformer, unlike ring main unit which requires three switchgears together.

2. Collect all switchgears together in one board at switching station room with their main outgoings and auxiliaries, which has a reflect on the initial and running cost of the solar project.

3. Ease to monitor, control and maintain.

4. Minimize the length and quantities of medium voltage cables.

5. No need for expensive pilot protection relays between transformer substations.

6. Utilizing the switchgear for more than one transformer (optional) (reduced number of switchgears).

Benefits of Using the Switchgear for More than One Transformer

Since the capacity rating of the switchgear exceeds 800 Amps (40 MW) and most of switchgears in the market can accommodate at least three cables; each one of three phases. Also, there is an ability to manufacture switchgear with more connected cables based on the request of the client. Since the status of the circuit breakers of these switchgears is normally closed (not for daily basis operation), only operate in case of emergency (protection) or maintenance (at night); then, there is a chance to connect more than one transformer cable per switchgear, taking in consideration that the load per each transformer can be controlled—connected and disconnected—from its low voltage side panel through its Air Circuit Breaker, ACB, which is able to be monitored and controlled locally and remotely.

Three transformers per switchgear has been chosen for 2 MWp and 3 MWp categories, two transformers per switchgear for 4 MWp category and one transformer per switchgear for 5 MWp category, however other selection are also applicable. Each category design can come with either full number of switchgears or reduced number of switchgears, the economical assessment is included within the proposal.

In case of reduced number of switchgears, each cable which is connected with switchgear has to be labeled to indicate the related transformation unit. Cables connected with plug-in termination—for easier connecting and disconnecting—and attached to its terminals a cable fault indicator which helps to identify the faulty cables in case of cable fault incident so easy to plug them out and earth them by portable earthing to the earthing system of switching station and restore the supply of others.

How to Avoid Risk when Using Radial Transformer Cable?

In general, any transformer is connected with radial cable to a switchgear or RMU. But, since the cable has a very short length (10-20 m) and laid inside building or trench, then it can be considered as protected from any external source of failure.

In our case, the transformation unit is far from switchgear by few hundreds of meters, where the cable must be laid with the same distance.

To secure and protect cables throughout this distance, certain conditions have to be emphasized on:

1. The cable must be laid from one piece of cable without any joint in the middle (no weak point). Therefore, there must be an in advance agreement with the cable manufacturer regarding the length of cable per drum taking in account the lengths of different pieces of radial cables which planned to be laid in the project.

2. Ensuring the quality work in all project execution stages like, approval of materials, factory acceptance tests, excavation, cable laying, cable tiles, back filling, cable termination and cable testing and commissioning.

3. At maintenance time, the insulation level (M Ohm) of the radial cable can be measured to insure that it is on the satisfactory level—few tens of M Ohms. During the measuring process, the switchgear circuit breaker and LV panel ACB of related transformers must be turned in open position. Using a Megger test device to apply testing voltage on the terminals of switchgear cables for one minute and note the reading, it should not be less than few tens of M Ohm. In case the reading is lower, cable should be disconnected from transformer—releasing bolts and nut bolts—and the Megger test to be repeated for all individually. A corrective action should be taken based on the test results.

4. The area of solar project must be considered as a protected area. No civil works have to be permitted after commissioning of the project.

5. In case of any failure in the cable, the faulty cable must be isolated from both sides. The distance of fault point can be determined (by measuring device) and physical location of fault can be located.

For More Conservative Protection and Control Method:

In addition to the existing Over Current/Earth Fault protection, an additional Deferential Relay can be installed at switchgear side per each radial cable to protect both radial MV cable and transformer (MV/LV). Relay will receive and compare information of both power values at radial cable switchgear side (MV) and transformer secondary side (LV), and it will trip the MV switch-gear in case there is a sufficient difference in power values which indicates to fault occurrence.

Or by adding Radial MV Switch-gear at transformation unit side, not RMU, for local control and protection. This MV switch gear comprises input cable terminal (for transformer cable connection) and output cable terminal (for radial cable connection), two isolators with earth switches at both sides and with circuit breaker in the middle. In this case ACB at LV panel side is not required and can be replaced by Load Disconnector or Isolator. This Radial MV-Switchgear is remotely monitored and controlled.

Transformation Unit:

In the transformation unit, the transformer is coupled directly with the LV panel through bus duct to eliminate the need of large number of LV cables to carry high current at low voltage side estimated by thousands of Amps.

2. Transformer:

Types of transformers:

Proposed Transformer voltage is 33 KV at the medium voltage side and varying from 0.4 to 0.7 KV at the low voltage side.

There are several types of transformers with their own advantages like:

1. Oil immersed transformer, cheaper solution.
2. Dry type transformer, maintenance free solution.
3. Amorphous core transformer, the lowest no load losses.
4. SLIM type transformer, the optimum solution.

Benefits of Using SLIM Type Transformer:

a) SLIM transformers use Nomix high temperature insulation and high temperature fluid (Silicone, Biotemp or ester fluids).

b) Using the high insulation materials—both thermal and electrical—helps to have a very compact design—weight and size—around 25% reduction from comparable transformer.

c) They have higher mechanical and dielectrical strength and can be operated at high temperature.

d) It can be designed to withstand extra power capacity in emergency peak load situation.

e) It is possible to offer lower losses compared with conventional insulation by using Nomix.

f) It is better in withstand short circuit forces, and not loosing this feature due to aging.

g) Its dielectric medium fluids provide excellent fire resistance and environment friendly compared with conventional oil transformers.

So, based on the above mentioned advantages of SLIM transformer, there is a chance to neglect the over sizing of transformer capacity by margin of 20% over the MW peak of solar block and keep the rating of transformer as much as the MWp of solar block by using SLIM transformer, since the SLIM transformer can withstand the overloads which might appear at some summer days peaks, whereas its top oil temperature and losses can be maintained on the same rate.

The Usage of SLIM Transformers can Provide Additional Benefits:

1. In case of sizing the transformer (MW) with same size of solar block (MWp), then the extra cost due to using SLIM transformer can be compensated by downsizing transformer compared to conventional transformer.

2. The downsizing will help to reduce the no load losses (smaller core size transformer) and reduce the load losses by using transformer with lower percentage impedance.

It is recommended to go to use bio-SLIM type transformer which use fluid of synthetic ester like MIDEL 7131 rather than silicon fluid especially for these two advantages:

1) It is readily biodegradable fluid which has a much smaller impact on the environment if it leaks or is spilled.

2) It has a lower viscosity and higher specific heat than silicone and therefore the cooling is more efficient.

3. Low Voltage AC Panel:

Consists of three major elements:

1. Enclosure with bus-bars.
2. Air circuit breaker.
3. Row of MCCBs.

1. Enclosure with Bus-Bar:

The enclosure of LVAC panel shall be designed to withstand outdoor application. Bus-bar should have proper cross section so as to easily carry the solar power block current and be rigid enough to withstand the short circuit current that could be supplied from both sides.

2. Air Circuit Breaker:

Its main functions are to monitor, control and protect the output power generated from solar block. Its breaking capacity rating varies from 800 A to 6300 A. The latest ACB has built-in trip and control unit which offers communications and measuring functions in addition to its original advance protection and discrimination features.

This trip and control unit can provide accurate network parameters measurement like current, voltage, power, energy, PF and harmonics and communicate the data to the control center. At the same time ACB enables the local user as well as the remote end user to receive device identification, status indication (ON/OFF . . . etc), controls (opening/closing) and setting adjustment for system and protection. So, this ACB can be considered as the guard of the solar block who has a brain to monitor, process, act and communicate.

Control center can utilize LVAC Panel ACB for remotely operating all solar blocks (ON/OFF/Trip), also, to monitor and control the output of solar blocks and store and analyze data. Manufacturers can provide human machine interface programs at the control station display PC to monitor, control, adjust setting and analyze, with all relevant features, the output of solar blocks within the solar park.

Electrical and mechanical interlocking schemes are available as options with modern ACB.

3. Row of MCCBs:

MCCBs ratings vary from 100 A to 3200 A and can be adjusted. They have different short circuit current capabilities that depend on their low voltage rating. Their feature of discrimination will help to keep the clearance of the fault is the duty of the closest upstream circuit breaker and isolate only the faulty cable to secure the continuity of the supply. The MCCB has the communication of status indication (ON/OFF or Trip to earth) as a standard. In case it is equipped with a trip and control unit, various types of accurate measurement and advance protection can be provided locally and remotely.

Recommendation from Design Point of View:

At the 0.4 KV system, better not to go for MCCB greater than 630 Amp (450 KW) to have a proper LV cable that can carry such current.

At the 0.7 KV system, better not to go for MCCB less than 630 Amp MCCB (750 KW) to have the right MCCB that can withstand high short circuit current.

So, as an option, the 630 Amp MCCB seems to be the most suited to make the row of MCCBs.

In case that the source of supply is coming from central inverter, standard MCCB is sufficient. But in case that the source of supply is coming from LVAC feeder pillar connecting several string inverters, then full MCCB functions is recommended.

The Connection Between the LV Panel of Transformation Unit and Solar PV Inverters:

It can be any suitable LV cable that can carry the rated current of solar PV central inverter without exceeding the permitted voltage drop percentage.

The current common practice is to have solar PV central inverter or station inverter connected directly with the transformer in the same substation. But, since there are outdoor, self cooled, environmentally isolated central inverters (max. at 0.7 KV) or LVAC feeder pillars connecting several string inverters, then it is recommended to install them in the central or optimal locations between solar PV arrays and lay LV AC cables up to the main LV Panel of the transformation unit. The length of these cables should not exceed approx. 100 meters which is the acceptable distance such that cables can carry their rated current with max. 2.5% voltage drop out of 415 volt, as described by the cable manufacturers in the cable current rating-distance chart for the cable laid direct in ground.

If it can be imagined that the LV AC cable can be laid for 100 meters from transformation substation toward solar PV central inverter, after that the DC string cables be laid for another 100 meters to the string or combiner boxes, then the far end point distance is 200 meters, multiplied by 2 for both sides directions of transformation unit, the result would be 400 meters is the maximum width of solar block with an area of 400 m×400 m=160,000 sq.m which is greater than the largest proposed solar block of 5 MWp area 315 m×315 m=100,000 sq.m. This means that the 5 MWp is a realistic design.

LV AC & DC cables:

The new design aims to reduce quantities and cross section areas of AC & DC cables and their associated voltage drop and power losses. For this purpose the positioning of electrical equipments in optimum locations is essential. The centralization of solar devices within their relevant connections is confirming the optimum locations. For instant, transformation unit is to be installed in the middle of solar block, the central inverters are in center of their connected DC cables as well as LV feeder pillars and combiner boxes also. By this way, the aim can be fulfilled. Additionally, solar block can be enlarged without fear of major voltage drop.

The Control Cables:

Control cables have to be laid parallel to power cables to communicate between transformation units, switching stations and transmission substation control room. All measured data, device identification, status indication (ON/OFF . . . etc), control instruction (opening/closing) and setting adjustment for system and protection for relevant devices can be transmitted and exchanged through this control cables and RTU's. Control cables are the medium to transmit signals and are preferred to be fiber optic cables.

4.0 Why Categorization?

For Two Major Reasons:

First: to suite different types of solar technologies that have several rates of efficiencies.

To explain that, let's have a given area size of 1 sq. KM which can be divided into 16 area blocks, each block has an area of 250 m×250 m=63,000 sq.m. When being utilized for different types of solar technologies, The result would be the following:

1. Thin film solar technology with eff.=(10-12%):
Possible installed capacity P=2 MWp.
2. Multi crystalline solar technology with eff. (13-15%):
Possible installed capacity P=3 MWp.
3. Single crystalline solar technology with eff. (16-18%):
Possible installed capacity P=4 MWp.
4. High efficient PV technology with eff. (20-23%):
Possible installed capacity P=5 MWp.

Then, each block has to have its own transformation unit size based on its peak solar power production whereas switching station could stay the same and that will help to standardize the relevant electrical equipments.

Second: to suite different low voltage levels (DC & AC) of solar technologies.

The low voltage level (DC & AC) are used to transfer the energy from solar panels via solar inverters to the transformation unit.

The DC voltage can reach up to 1000 V or more and the AC low voltage used is varying form 380 V (400 V) min to 690 V (700 V) max.

The LV cables cross sections with their limited current currying capacity and their associated voltage drop and power loss, will limit the size of solar block area, which in turn, determine the maximum generating power—based on the type of technology and given area—that define the size of transformation unit.

For more economical project, the higher low voltage value and larger possible transformation unit, is the one to be chosen, if possible, when making decision.

5.0 Efficiency (AC):

To maximize the AC power transfer efficiency throughout the energy collection system not to be less than 98%, hence, the losses have to be restricted not to be more than 2%.

How to Achieve the Efficiency of 98%?

There are two major sources of losses in the energy collection system:

1. The Transformers.
2. The H.T. cables.

First: The Transformer:

At the initial stage of preparation of specification of transformers, there must be an emphasis on the load losses at full load at temperature of 75 C & 120 C to be less than 1% of the rated capacity of the transformer and the no load loss should not exceed 0.1%. These values must be confirmed during the testing of transformers at factory (FAT).

During real operation of solar PV system, the fully loading hours on transformer can be experienced only at mid of summer days, but in general, average loading ratio is much lower and could equal to the capacity factor of solar project which is around 25%, hence, the average losses is lower than 1%, say it is 0.75%.

Second: The MV Cables:

The losses in the cables are proportional to the square of the current. The main HT cable is double circuit and designed to have double of the normal capacity for meeting contingencies and to have very low resistance which produces very low losses at rated power add to that, the average loading is around 25% of the rated power.

The radial cables—between switching station and transformation units—carry energy at medium voltage (33 KV) for short distance (hundreds of meters) with oversized cross section to have very low losses and voltage drop.

6.0 Main Specification of Each Solar Block Category Components (Trans. & LV Panel):

| specification of: 2 MWp Solar Block Category | | | | |
|---|---|---|---|---|
| Transformer No: | 1 | 2 | 3 | 4 |
| Low voltage level (KY) | 0.4 | 0.4 | 0.7 | 0.7 |
| Type of transformer | Conventional Tx. | SLIM-Tx. | Conventional Tx. | SLIM-Tx. |
| Transformer rating (MVA) | 2.5 MVA | 2 MVA | 2.5 MVA | 2 MVA |
| Voltage ratio | 33/0.4 KV | 33/0.4 KV | 33/0.7 KV | 33/0.7 KV |
| Winding Connection | DYN | DYN | DYN | DYN |
| Tx. Max Isc | 50 KA | 50 KA | 50 KA | 50 KA |
| Percentage impedance % z | 0.08, 8% | 0.06, 6% | 0.05, 5% | 0.04, 4% |
| Current rating L.V. Panel | 3,600 A | 2,887 A | 2,062 A | 1,650 A |
| Busbar current rating Ir (A) | 4,000 A | 4,000 A | 3,000 A | 2,000 A |
| B/B Isc (KA) | 60 KA | 60 KA | 60 KA | 60 KA |
| ACB Ir (A) | 4,000 A | 4,000 A | 3,200 A | 2,500 A |
| MCCB,s Ir | Flexible | Flexible | flexible | flexible |
| ACB & MCCB Isc (KA) | 60 KA | 60 KA | 60 KA | 60 KA |

| Specification of: 3 MWp Solar Block Category | | | | |
|---|---|---|---|---|
| Transformer no. | 1 | 2 | 3 | 4 |
| Low voltage level (KY) | 0.4 | 0.4 | 0.7 | 0.7 |
| Type of transformer | Conventional Tx. | SLIM-Tx. | Conventional Tx. | SLIM-Tx. |
| Transformer rating (MVA) | 4 MVA | 3 MVA | 4 MVA | 3 MVA |
| Voltage ratio | 33/0.4 KV | 33/0.4 KV | 33/0.7 KV | 33/0.7 KV |
| Winding connection | DYN | DYN | DYN | DYN |
| Tx. max Isc | 60 KA | 50 KA | 50 KA | 50 KA |
| Percentage impedance % z | 0.10, 10% | 0.09, 9% | 0.08, 8% | 0.06, 6% |
| Current rating L.V. Panel | 5,774 A | 4,330 A | 3,300 A | 2,474 A |
| Busbar current rating Ir (A) | 6,300 A | 5,000 A | 4,000 A | 3,000 A |
| B/B Isc (KA) | 70 KA | 60 KA | 60 KA | 60 KA |
| ACB Ir (A) | 6,300 A | 5,000 A | 4,000 A | 3,200 A |
| MCCB,s Ir | Flexible | Flexible | flexible | flexible |
| ACB & MCCB Isc (KA) | 70 KA | 60 KA | 60 KA | 60 KA |

| Specification of: 4 MWp Solar Power Block Category | | |
|---|---|---|
| Transformer no. | 1 | 2 |
| Low voltage level (KV) | 0.7 | 0.7 |
| Type of transformer | Conventional Tx. | SLIM-Tx. |
| Transformer rating (MVA) | 5 MVA | 4 MVA |
| Voltage ratio | 33/0.7 KV | 33/0.7 KV |
| Winding connection | DYN | DYN |
| Tx. max Isc | 50 KA | 50 KA |
| Percentage impedance % z | 0.09, 9% | 0.08, 8% |
| Current rating L.V. Panel | 4,124 A | 3,300 A |
| Busbar current rating Ir (A) | 5,000 A | 4,000 A |
| B/B Isc (KA) | 60 KA | 60 KA |
| ACB Ir (A) | 5,000 A | 4,000 A |
| MCCB,s Ir | Flexible | Flexible |
| ACB & MCCB Isc (KA) | 60 KA | 60 KA |

| Specification of: MWp Solar 5 Power Block Category | | |
| --- | --- | --- |
| Transformer no. | 1 | 2 |
| Low voltage level (KV) | 0.7 | 0.7 |
| Type of transformer | Conventional Tx. | SLIM-Tx. |
| Transformer rating (MVA) | 6.3 MVA | 5 MVA |
| Voltage ratio | 33/0.7 KV | 33/0.7 KV |
| Winding connection | DYN | DYN |
| Tx.Max Isc | 60 KA | 50 KA |
| Percentage impedance % z | 0.10, 10% | 0.09, 9% |
| Current rating L.V. Panel | 5,200 A | 4,124 A |
| Busbar current rating Ir (A) | 6,300 A | 5,000 A |
| B/B Isc (KA) | 70 KA | 60 KA |
| ACB Ir (A) | 6,300 A | 5,000 A |
| MCCB,s Ir | Flexible | Flexible |
| ACB & MCCB Isc (KA) | 70 KA | 60 KA |

7.0 Cost Estimation and Economical Assessment:

Rough estimation for the cost of the energy collection system used for 100 MWp solar PV project (including transformation units cost and excluding sub-transmission s/s cost) per category based on the reduced numbers of switchgears design, SLIM Transformers and 0.7 KV low voltage level AC network. With respect to the 2 MWp solar block category, the estimated cost (Eurocent/Wp) is as follows:

| No | 2 MWp Category Item | unit | Quantity | Cost per unit (euro) | Cost of item (euro) |
| --- | --- | --- | --- | --- | --- |
| 1 | 1 c × 630 sqmm cu 33 KV/XLPE/SWA | meters | 18000 | 50 | 900,000 |
| 2 | 3 C × 70 sqmm AL 33 KV/XLPE/SWA | meters | 21600 | 20 | 432,000 |
| 3 | Tx: 2 MVA, 33/0.7 KV | numbers | 48 | 50,000 | 2,400,000 |
| 4 | LV Panel : 2000 A, 60 KA | numbers | 48 | 20,000 | 960,000 |
| 5 | 33 KV Switchgear, with VCB Ir = 1250 A, Isc = 31.5 KA | numbers | 28 | 40,000 | 1,120,000 |
| 6 | Switching Station civil work + batteries + charger + scada | numbers | 4 | 100,000 | 400,000 |
| 7 | Transfation Unit civil work | numbers | 48 | 12,000 | 576,000 |
| 8 | Cable laying | meters | 27000 | 8 | 216,000 |
| 9 | Equipments installation, testing and commissioning | numbers | 76 | 5,000 | 380,000 |
| 10 | Total cost ( euro) | euro | | | 7,384,000 |
| 11 | Total project capacity | MW | 96 | | |
| 12 | Cost ratio Euro/watt | Euro/W | (7384000/ 96000000) | = 0.077 | = 7.7 eurocent/W |

After applying the same calculation process on the remaining solar block categories, then the estimated unit cost (eurocent/Wp) for energy collection system based on the above conditions for 2 MWp, 3 MWp, 4 MWp, and 5 MWp categories are 7.7 eurocent, 6.0 eurocent/Wp, 5.5 eurocent/Wp and 4.9 eurocent/Wp respectively. This gradual reduction in the cost is resulting mainly from reduction in usage of electrical components like cables, transformers and switchgears due to selecting larger solar blocks and larger transformation units instead.

Additional Source of Cost Saving:

Using Aluminum conductor instead of Copper conductor cables in the medium voltage Primary cables:

Replacing the main MV Copper cables:

Size: 2×3×1C×630 mm2 33 KV CU/XLPE/SWA

By equivalent Aluminum MV cable:

Size: 2×3×1C×800 mm2 33 KV AL/XLPE/SWA

With approx. the same carrying capacity but difference in prices due to the difference in price of the main cost factor, the conductor material. At the time when the cost of one ton of aluminum equals one quarter of the cost of one ton of copper, which lead to 50% reduction of the cost of the MV cable when shifting from MV copper cable to its equivalent of MV aluminum cable. This cost difference will lead to cost saving around (450,000) euro or 0.4 eurocent/watt.

Steps of Making Economical Decision:

1—Choosing the solar system design category, based on solar project shape, solar panel efficiency and solar inverter voltages.

2—Choosing the number of switchgears, reduced or non reduced, based on the degree of reliability required.

3—Choosing the MV cable conductor type, Copper or Aluminum, based on current prices of the MV Copper and Aluminum cables in the market.

Economical Assessment:

The following table illustrates an economical comparison between energy collection systems (MV AC) of traditional design and new optimized design for 100 MWp proposed solar park. It has been assessed with reference to a real project design and with applying the alternative new 2 MWp solar block category design with its reduced number of switchgears on the project energy collection system.

| Features | Traditional design | Optimized design |
| --- | --- | --- |
| Number of Transformers | 96 | 48 |
| Number of Switchgears | 300 | 32 |
| Total Length of Primary MV cables (meters) | 25,000 | 18,000 |
| Number of substation building | 96 | 52 |
| Total energy collection system cost (Euro) | 21,376,000 | 7,704,000 |
| Material and installation saving (Euro) | — | 13,672,000 |
| System cost saving percentage (%) | — | 64% |
| Maintenance saving percentage (%) | — | 80% |

As it can be seen from the table above, the new optimized design of the present invention has the ability to minimize material and installation costs of energy collection system by more than 50% (the calculated result is 64%). The reduction of maintenance and operational cost is more than 50% (the maintenance saving was calculated to be about 80% based on the reduction of electrical components used).

The new optimized design has higher efficiency and lower losses due to high reduction of electrical components (mainly transformers). It also shows the ability over the traditional design for high reduction in material and maintenance costs while maintaining the same carrying capacity with lower energy losses.

The new optimized design has the ability to further reduce cost by upgrading to a larger solar block category and/or changing MV cables from Copper to Aluminum. The additional reduction will help to increase the saving to be more than 70%.

8.0 Application of Energy Collection System and Transmission System for Large Scale Renewable Project:

The design of energy collection system is applicable for other renewable energy technologies project in addition to solar PV; however the application point will start with capacity size of energy production unit.

Application on Wind Projects:

In case of wind farm project, the wind turbines with capacity of one to eight MW per each turbine will be considered as power block and will represent the transformation unit in the new design. Radial switchgear can be used in this case with wind turbine transformer. The design of energy collection system starts from this point and continue up through switching stations, sub transmission s/s and main transmission s/s based on the size of wind farm. Drawings for different types of application of energy collection system for large scale wind farm is illustrated in FIGS. 17 to 28, based on the size of wind farm and capacity of wind turbine used.

Application on Bio-Energy Project:

For large scale bio-energy project using many small or mid size generators, the application starts with size of generator used. For example, if the generator is with production capacity of one to few Mega-Watts, then the generator will be considered as power block and will be connected directly to the transformation unit in the new design. If the generator is with production capacity of few hundreds of kilowatt, then the generator will replace the central inverter location in solar PV design. Then energy collection system will start from that point and continue through a LV AC cables up to transformation unit, switching station, sub transmission s/s and main transmission s/s based on the overall capacity of bio-energy project.

It should be understood that the capacities of the systems and the different components presented in the above are for example purposes only and that the collection system according to this invention can work at any scale regardless of the size and capacity of the system and with renewable and conventional power generation projects as well.

The invention claimed is:

1. A method of enhancing collection of electrical power in an energy collection system comprising a number of switching stations divided into a number of sets, each set comprising a number of pairs, the method comprising:
for each pair of switching stations in a set, the pair comprising a first switching station having a first switching gear board and a second switching station having a second switching gear board:
connecting a first set of one or more transformation units radially using a first input in the first switching gear board;
connecting a second set of one or more transformation units radially using a first input in the second switching gear board;
connecting the first switching station to the second switching station using a first output in the first switching gear board and a first output in the second switching gear board;
connecting the first switching station to a first sub-transmission station using a second output in the first switching gear board;
connecting the second switching station to the first sub-transmission station using a second output in the second switching gear board.

2. The method of claim 1, further comprising:
connecting a third set of one or more transformation units radially using a second input in the first switching gear board; and
connecting a fourth set of one or more transformation units radially using a second input in the second switching gear board.

3. The method of claim 2, further comprising:
connecting the first sub-transmission station to the main station;
connecting the main station to an electrical grid; and
for each set of switching stations, repeating the above steps by replacing the first sub-transmission station with another sub-transmission station.

4. The method of claim 2, further comprising:
the radial connections are conducted using medium voltage electrical cables;
the connection between the first and second switching stations are conducted using a medium voltage electrical cable;
the connection between the first switching station and the first sub-transmission station is conducted using a medium voltage electrical cable;
the connection between the second switching station and the first subtransmission station is conducted using a medium voltage electrical cable;
the connection between the first sub-transmission station and the main station is conducted using a high voltage electrical cable or overhead lines; and
the connection between the main station and the electrical grid is conducted using a higher voltage electrical cable or overhead lines.

5. The method of claim 2, wherein the transformation units comprise photovoltaic module blocks.

6. The method of claim 2, wherein the transformation units comprise wind turbines.

7. An energy collection system comprising:
a first switching station electrically connected to a first set of one or more transformation units for receiving a first electrical power generated thereby;
a second switching station electrically connected to a second set of one or more transformation units for receiving a second electrical power generated thereby;
a sub-transmission station having a first primary electrical connection with the first switching station and a second primary electrical connection with the second switching station for receiving the first and second electrical powers; and
a secondary electrical connection between the first and second switching stations;
wherein the secondary electrical connection and the first and second primary electrical connections form, using one or more additional switching stations, a closed-loop electrical circuit between the first switching station, the second switching station and the sub-transmission station,
wherein the first switching station is connected to the first set of one or more transformation units through a first radial connection; the second switching station is connected to the second set of one or more transformation units through a second radial connection, and
wherein the first switching station comprises a first switching gear board having a first switching gear board first input enabling the first radial connection with the first set of one or more transformation units, a first switching near board first output enabling the secondary electrical connection with the second switching station, and a first switching gear board second output enabling the first primary electrical connection with the first sub-transmission station; and the second switching station comprises a second switching gear board having a second switching gear board first input enabling the second radial connection with the second set of one or more transformation units, a second switching gear board first output enabling the secondary electrical connection with the first switching station, and a second switching gear board second output enabling the second primary electrical connection with the sub-transmission station.

8. The energy collection system as claimed in claim 7, wherein the radial connections and the first and second primary electrical connections and the secondary electrical connection are medium voltage electrical cables.

9. The energy collection system as claimed in claim 7, wherein the transformation units comprise photovoltaic module block.

10. The energy collection system as claimed in claim 7, wherein the transformation units comprise wind turbines.

11. An energy collection network comprising:
a plurality of switching stations divided into a number of sets, each set comprising a number of pairs, each pair comprising:
- a first switching station electrically connected to one or more sets of first one or more transformation units;
- a second switching station electrically connected to one or more sets of second one or more transformation units;
- a first secondary electrical connection between the first and second switching stations;

a plurality of sub-transmission stations, each sub-transmission station being associated to a set of switching stations and having in connection with each pair of said set of switching stations:
- a first primary electrical connection with the first switching station and a second primary electrical connection with the second switching station for receiving the first and second electrical powers, such that the first secondary electrical connection and the first and second primary electrical connections form, using one or more switching stations, a closed-loop electrical circuit between the first switching station, the second switching station and the sub-transmission station;

a main transmission station connected to the plurality of sub-transmission stations and having in connection with each sub-transmission station a main electrical connection, wherein:
each set among the one or more sets of the first one or more transformation units is connected to the first switching station through radial connections, where each one of the one or more transformation units has respectively one radial connection;

each set among the one or more sets of the second one or more transformation units is connected to the second switching station through respective radial connections, where each one of the one or more transformation units has respectively one radial connection;

the first switching station comprises a first switching gear board having:
- a number of first switching gear board inputs enabling the radial connections with the one or more sets of first one or more transformation units such that each one of the first switching gear board inputs enables a radial connection with one set of the first one or more transformation units;
- a first switching gear board first output enabling the first secondary connection with the second switching station; and
- a first switching gear board second output enabling the first primary electrical connection with the sub-transmission station; and the second switching station comprises a second switching gear board having:
- a number of second switching gear board inputs enabling the radial connections with the one or more sets of second one or more transformation units such that each one of the second switching gear board inputs enables a radial connection with one set of the second one or more transformation units;
- a second switching gear board first output enabling the second secondary electrical connection with the first switching station; and
- a second switching gear board second output enabling the second primary electrical connection with the sub-transmission station.

12. The network of claim 11, wherein the switching stations are divided into 4 sets, each set being divided into 8 pairs of switching stations.

13. The network of claim 11, wherein the switching stations are 64 switching stations divided into 4 sets of 16 switching stations each, each set of switching stations divided into 8 pairs of switching stations.

14. The energy collection network as claimed in claim 11, wherein the radial connections are medium voltage electrical cables, the primary electrical connections and the secondary electrical connections are medium voltage electrical cables, and wherein the main connections are high voltage electrical cable.

15. The energy collection network as claimed in claim 11, wherein the transformation units are photovoltaic module blocks.

16. The energy collection system as claimed in claim 11, wherein the transformation units are wind turbines.

* * * * *